United States Patent [19]

Cook

[11] 4,096,129

[45] Jun. 20, 1978

[54] GLUTARATE-CONTAINING POLYESTERPOLYOLS, METHODS OF PREPARATION AND POLYURETHANE COMPOSITIONS DERIVED THEREFROM

[75] Inventor: William H. Cook, Bloomfield Hills, Mich.

[73] Assignee: Fabridyne, Inc., Bloomfield Hills, Mich.

[21] Appl. No.: 619,834

[22] Filed: Oct. 6, 1975

[51] Int. Cl.$^2$ .................. C08G 63/04; C08G 18/32; C09K 3/00
[52] U.S. Cl. .................. 260/77.5 AN; 252/182; 260/75 T; 260/75 NH; 260/75 NP; 260/77.5 AM
[58] Field of Search ........... 260/75 T, 75 NH, 75 NP, 260/77.5 AM, 77.5 AN; 252/182

[56] References Cited

U.S. PATENT DOCUMENTS

| | | | |
|---|---|---|---|
| 3,004,939 | 10/1961 | Varvaro | 260/77.5 AM |
| 3,591,561 | 7/1971 | Kazama et al. | 260/77.5 AN |
| 3,663,515 | 5/1972 | Hostettler et al. | 260/77.5 AN |
| 3,666,724 | 5/1972 | Hostettler | 260/77.5 AN |
| 3,773,595 | 11/1973 | Burba et al. | 260/77.5 AN |
| 3,894,075 | 7/1975 | Schoen | 260/77.5 AN |
| 3,915,935 | 10/1975 | Abraham et al. | 260/75 NP |
| 3,963,656 | 6/1976 | Meisert et al. | 260/75 NP |

*Primary Examiner*—H.S. Cockeram
*Attorney, Agent, or Firm*—Gordon W. Hueschen

[57] ABSTRACT

Glutarate-containing polyesterpolyols are produced by reaction of primary and/or secondary diols and/or polyols with dimethyl glutarate in the presence of a transesterification catalyst which does not have deleterious effects on the behavior of such polyesterpolyols when they are employed in the subsequent preparation of polyurethane compositions, nor on the properties of such derived polyurethane compositions. The ratios of reactants are controlled so as to obtain essentially complete conversion to hydroxyl terminated compositions of predetermined molecular weight and hydroxyl functionality. An important modification of the above polyesterpolyols is that in which they are subsequently used as polyol intermediates in the preparation of glutarate-containing co-polyesterpolyols. These hydroxyl terminated glutarate polyesters and co-polyesters are used to produce a wide variety of polyurethane compositions which exhibit unexpected and extremely useful combinations of properties. The polyurethane compositions are useful as elastomers, foams, coatings, adhesives, thermoplastics, plasticizers, etc.

57 Claims, No Drawings

GLUTARATE-CONTAINING POLYESTERPOLYOLS, METHODS OF PREPARATION AND POLYURETHANE COMPOSITIONS DERIVED THEREFROM

BACKGROUND OF THE INVENTION

The preparation of polyesterpolyols for use in making polyester urethanes has been practiced commercially for some 20 years. (See J. H. Saunders & K. C. Frisch, "Polyurethanes: Chemistry and Technology," Part I, Interscience, New York-London (1962) pp. 1–15). Most of the work which has been done in this field has been concerned with utilization of chemical raw materials produced in large volume which are economically attractive and which impart desirable properties to the derived polyurethane compositions. As the basis for most polyesterurethane compositions produced commercially up to the present time, polyesterdiols and polyesterpolyols derived from adipic acid together with various lower aliphatic primary and/or secondary diols and triols have been employed. Epsilon-caprolactone also has found widespread use as the source of polyester backbone for many highperformance systems, and to a lesser extent azelaic acid, ortho-phthalic acid and isophthalic acid (together with aliphatic diols and triols) have been employed in certain applications.

The development of polyesterpolyols containing the glutarate moiety for use in the manufacture of polyurethane compositions has received relatively little attention in the past because the potential sources of glutarate (glutaric acid, glutaric anhydride and lower dialkyl glutarates) either were not commercially available in large quantities or were too expensive to be competitive with adipic acid, epsilon-caprolactone, etc. Several references do, however, disclose the preparation of poly(alkylene glutarate)s and their use in the preparation of polyurethane compositions. (See British Pat. Nos. 783,615, 802,245, and 882,603; also, U.S. Pat. No. 3,007,899). In these references the glutarate polyesters are mostly derived from glutaric acid; British Pat. No. 882,603 does describe the preparation of a co-polyester from a mixture of dimethyl succinate, dimethyl glutarate, dimethyl adipate and other raw materials by means of a process (zinc acetate catalyst), which would not yield products of the level of quality of the present invention because the residuum of zinc in the product would catalyze the reaction of isocyanates with the polyesterpolyols.

The ready availability of dimethyl glutarate at competitive prices suggests that hydroxyl terminated polyesters thereof could be used advantageously in the production of polyurethanes but heretofore no satisfactory process has been available for mmaking such esters and no entirely satisfactory products have heretofore been available.

It has been proposed to prepare polyethylene terephthalate fibers by transesterification using stannous formate as the catalyst. The products thus produced, however are not useful in the preparation of polyurethane. It is not known that stannous formate cannot be used for catalyzing the transesterification of dimethyl glutarate but it is obvious from its known properties that it would be the least desirable of the stannous alkanoates. It is not unusual for the lowest member of a series to have atypical properties and this is indeed true with formic acid and its salts. Thus formic acid is known to be an oxidizing and a reducing agent, and conceivably could have an adverse reaction on some of the components of the system. For example, the stannous formate is likely to become contaminated with oxytin compounds through oxidation and such a catalyst, while useful in terephthalate manufacture, would not be suitable for the polyester glutarate manufacture of the invention because the tetravalent tin maintains its activity as a catalyst for catalyzing the reaction of the diisocyanates with active hydrogen compounds, and would therefore interfere with the use of such polyesters in the manufacture of polyurethanes. Moreover, a formate is not, strictly speaking, an alkanoate, or other aliphatic or aromatic carboxylate, as the carboxyl group is not attached to an organic radical.

SUMMARY OF THE INVENTION

It has been found that these objects are accomplished in the present invention by effecting a transesterification of a dilower alkyl glutarate either by itself or in combination with a minor amount of a dilower alkyl ester of another dicarboxylic acid by heating the same in the presence of a polyol and a catalytic amount of a stannous salt of a carboxylic acid, said reaction mixture containing up to about 150 ppm tin, and at a temperature sufficient to effect transesterification with the distilling off of lower alkanol and to destroy the activity of the catalyst for promoting the reaction of isocyanate with active hydrogen compounds. By this process, novel hydroxyl terminated glutarates are obtained which are characterized by a residumm of said stannous salts, which due to the processing no longer has the activity of a catalyst for promoting the reaction of isocyanates with active hydrogen compounds, and a residuum of carbalkoxy groups, and a low melting point, which advantageously is below, at, or only slightly above room temperature.

It has been proposed heretofore to use tin catalysts for the preparation of polyesters. Tin (II), tin (IV) and organo tin compounds (compounds in which the tin is linked to carbon) have been proposed for catalyzing the esterification of dicarboxylic acids and anhydrides with polyols. See, for example, U.S. Pat. Nos. 3,162,616, 3,194,791, 3,474,125, and 3,716,523. In all of these patents, however, the reactions involve water which has been found to inactivate stannous compounds. Therefore, the stannous compounds have to be used in large quantities as in U.S. Pat. No. 3,474,125, or added only toward the end of the processing, advantageously, in incremental amounts, according to U.S. Pat. No. 3,716,523. These processes when applied to glutaric acid or glutaric anhydride do not produce hydroxyl terminated polyester glutarates having the same high quality as those produced by the process of the invention, due either to the large quantity of tin required which promotes disproportionation to tin (IV) and metallic tin, or to the fact that the condensation is carried out at relatively high temperatures in the presence of water. Such processes also are clearly not useful in connection with polyols which are sensitive to water. The kind and character and amount of the catalyst in such processes is not critical to further usage except where disproportionation results in the formation of tin (IV) compound and metallic tin because the stannous salts are destroyed, as far as catalytic activity is concerned, by water.

It has been found, further, that when the hydroxyl terminated polyester glutarates of the invention are reacted with isocyanates to form isocyanate terminated polyester glutarate urethanes, the residuum of tin left in the hydroxyl terminated polyester glutarates does not adversely effect the later reaction between the hydroxyl terminated polyester glutarate and the isocyanate. That is to say, the residuum of tin no longer has catalytic activity to promote the reaction between isocyanates and compounds containing reactive hydrogen. Surprisingly, however, the residuum of tin still retains its catalytic activity for promoting transesterification. This makes it possible to convert hydroxyl terminated polyester glutarates to higher molecular weight hydroxyl terminated polyester polyglutarates by adding dimethyl glutarate thereto, and heating, as in the initial processing. Or, instead of dimethyl glutarate there can be added dimethyl adipate or dimethyl azelate or other dimethyl ester of other dicarboxylic acids to obtain a similar chain extension but with mixed glutarate moieties and moieties of the other dicarboxylic acid. Similarly, the hydroxyl terminated polyester glutarates may be converted to lower molecular weight polyesters by means of transesterification equilibration with polyols or hydroxyl terminated polyesters of lower molecular weight.

It has further been found that the novel hydroxyl terminated polyester glutarate compositions and the novel hydroxyl terminated polyester glutarate urethanes of the invention are useful in preparing curative agents for the chain extension of the isocyanate terminated polyester glutarate urethanes of the invention. It has been found, for example, that such chain extenders as aromatic diamines, which are particularly useful when the isocyanate is 2,4-tolylene disocyanate, or lower molecular weight polyols which are particularly useful when the isocyanate is 4,4-methylenebis (phenyl isocyanate), can be dissolved in the hydroxyl terminated polyester glutarates or hydroxyl terminated polyester glutarate urethanes of the invention to provide curative agents having special advantages. Thus, these curative agents are usually liquid and always have lower melting points than the chain extender. Also, the pot life of the casting system is substantially greater than with the chain extender per se. Also, the flex fatigue resistance of the derived elastomers is substantially improved. Also, the curative has higher equivalent weight than the chain extender per se and this provides prepolymer/chain extender ratios close to unity, which in turn improves metering accuracy and mixing, and increases mixing machine output rate.

OBJECTS

It is an object of the invention therefore to provide novel processes for the preparation of hydroxyl terminated polyester glutarates and to provide novel hydroxyl terminated glutarates which have new and unexpected advantages in the preparation of polyurethanes.

A further object of the invention is to provide novel and improved isocyanate terminated polyester urethanes useful in the preparation of polyurethane elastomers. A still further object of the invention is to provide novel chain extenders effective in converting such isocyanate terminated polyester urethanes to polyurethane elastomers.

Still other objects are to obtain improved polyurethane compositions and to obtain such other advantages as will appear as the description proceeds.

DETAILED DESCRIPTION OF THE INVENTION

Process for the manufacture of hydroxyl terminated polyesters from dimethyl glutarate and/or other dialkyl dicarboxylates:

The glutarate-containing polyesterpolyols of the present invention are prepared by transesterification of dimethyl glutarate (alone or in admixture with another lower dialkyl dicarboxylate containing at least 4 and not more than 20 carbon atoms with one or more polyols (diols, triols or higher-functionality polyols), containing primary and/or secondary hydroxyl groups, but no tertiary or aromatic hydroxyl groups. Methanol (or other lower alkanol) is distilled from the reaction mixture as the transesterification proceeds in such a way as to minimize the concentration of methanol present without excessive losses of the (less volatile) reactants. The ratio of reactants, taking into account any losses which occur during the reaction, determines the number average molecular weight and average hydroxyl functionality of the product. The ratio, total hydroxyl equivalents: total ester equivalents is always greater than unity so as to provide essentially exclusive hydroxyl termination of the polyester chains when the transesterification is complete. When higher functionality polyols are employed as hydroxyl reactants, alone or in admixture with diols, there are additional limitations on the permissable charge ratios so as to prevent formation of crosslinked polyester products. The concept of utilizing charge ratios which provide hydroxyl chain termination together with predetermined average functionality and number average molecular weight are well known and do not require elaborate explanation here (see, for example, Robert W. Lenz, "*Organic Chemistry of Synthetic High Polymers,*" Interscience, New York (1968), Chapters 3-4).

The essence of the transesterification process of the invention is a combination of controlled reaction conditions together with the use of certain transesterification catalysts which, together, yield polyesterpolyols of high quality for application in the subsequent preparation of a wide variety of polyurethane compositions. The reaction conditions are chosen so as to provide essentially complete transesterification and removal of methanol (or other lower alkanol) in minimum process time, while avoiding side reactions due to excessive reaction temperatures. The reaction conditions also are chosen with regard to the behavior of the catalysts used, which catalysts, under certain conditions, can bring about side reactions, and under other conditions may rapidly lose activity as transesterification catalysts within the scope of catalyst concentrations contemplated in the present invention.

The catalysts of the invention are tin (II) compounds, especially the stannous salts of alkanoic and alkenoic acids and dialkanoic and dialkenoic acids, some of which are commercially available. Under certain reaction conditions, the reaction conditions of the invention. these tin compounds have been found to be effective transesterification catalysts at surprisingly low concentrations. For example, stannous 2-ethylhexanoate is effective at levels as low as 3–6 ppm of reaction mixture, based on the tin content. However, due to practical limitations on conditions necessary to maintain catalyst activity at such low concentrations, it has been found more practical to employ this catalyst at levels providing 15–75 ppm tin. At higher concentrations (approximately upwards of 150 ppm tin), reaction rates may be improved, but certain undesirable effects also are observed. The present invention contemplates the use of this tin (II) compound at tin concentrations up to 150 ppm parts of reaction mixture, and preferably at levels of 7.5-60 ppm tin. Other tin (II) salts of the afore-noted acids can be used at like concentrations based on the tin content of the catalyst.

In order to maintain catalytic activity at such low catalyst levels, it is essential to exclude oxygen and moisture from the reaction mixture. Particularly at the relatively high reaction temperatures employed, traces of oxygen rapidly oxidize the tin (II) salt to oxytin (IV) compounds; although the latter sometimes are effective transesterification catalysts, they have deleterious effects on the behavior of the polyesters and derived products in urethane applications. Moisture brings about hydrolysis and deactivation of the tin (II) catalyst, sometimes together with formation of insoluble solids in sufficient amount so as to make the polyester appear hazy.

Tin (II) compounds such as stannous 2-ethylhexanoate are well known to be powerful catalysts for the isocyanatehydroxyl reaction, even at levels of the order of 100 ppm. It is surprising, therefore, that the hydroxyl-terminated polyesters of the invention exhibit essentially unenhanced reactivity toward isocyanates. This feature is especially important in applications of the polyesters such as the manufacture of castable polyurethane elastomers and polyurethane thermoplastics. Furthermore, tin (II) compounds are known to be effective esterification catalysts under conditions where water is removed from the reaction mixture in such a manner as to prevent hydrolysis of the catalyst, and, at sufficiently high concentrations (e.g., 1,000 ppm) even without rapid removal of the water. Therefore, the tin (II) compounds would be expected to catalyze hydrolysis of the polyesters as well. At the low concentrations of the invention, however, the tin (II) catalyst residues seem to have little or no effect on the rate of hydrolysis.

In view of the above findings, it is believed that, at low concentrations, the tin (II) carboxylates of the invention exchange with the polyester products so as to liberate (traces) of carboxylic acid while the tin ultimately is incorporated in the polyester chain. At the comparatively low temperatures at which the polyester products are employed in the manufacture of polyurethane compositions, the tin, in this immobile form, is essentially inactive as a catalyst for the hydroxyl-isocyanate reaction. If the polyester or its urethane derivatives are subjected to hydrolytic conditions, the tin again either is inactive or is hydrolyzed to a species which is ineffective as a hydrolysis catalyst at such low concentration.

Therefore, the tin (II) salts of carboxylic acids, according to the invention, especially alkanoic acids and some alkanedioic acids, have been found to be surprisingly effective as transesterification catalysts under controlled conditions without causing the expected deleterious effects of catalysis of the hydroxyl-isocyanate reaction and/or sensitization of the polyesters and their polyurethane derivatives to hydrolysis.

Some stannous carboxylates are not as useful as catalysts in the process of the invention as are others. For example, stannous oxalate seems to be relatively ineffective, perhaps due to the strong affinity of the oxalate group as a complexing agent for tin, or due to poor solubility of this tin compound in the polyester reaction mixtures. Like the formate, the oxalate is the lowest member of its series and therefore could be expected to behave differently. Moreover, it is not a true alkanedioic acid because the carboxyl groups are not attached to an alkane residue. The preferred tin (II) compounds are the lower stannous alkanoates such as stannous acetate, propionate, butyrate, valerate, caproate, 2-ethylhexanoate, etc., although higher homologues, such as stannous stearate, can be employed. The corresponding alkenoates, for example, stannous oleate, can be employed.

The general polytransesterification process of the invention is as follows: The reaction mixture of dimethyl glutarate (with or without other dialkyl dicarboxylate), and hydroxyl-bearing components is charged to a reaction vessel equipped with agitator, temperature-measuring device, nitrogen inlet and fractional vacuum distillation train. The material of construction of the reaction system preferably is stainless steel or glass. With good agitation, the reaction mixture is heated to the point at which methanol (or other lower alkanol) slowly begins to distill, together with any moisture present as an impurity. In the case of ethylene glycol and dimethyl glutarate as reactants, for example, this usually occurs at about 160°-180° C. Slow take-off of distillate is continued until the boiling point of the distillate is that of the pure alcohol; this drying step usually requires 15-30 minutes. Then 20-50 ppm of stannous 2-ethylhexanoate (or other stannous alkanoate in the amount equivalent to the above on the basis of tin content) is injected into the reaction mixture. The rate of formation of alcohol usually increases within a few minutes, and often is sufficiently rapid to require reduction of the temperature of the reaction mixture in order to control the fractional distillation. The temperature is increased as rapidly as is consistent with the ability of the distillation train to separate alcohol from the higher boiling components of the reaction mixture. When the temperature reaches 210°-215° C, heat input is adjusted to maintain this temperature and the reaction is allowed to continue until the rate of distillation of alcohol is substantially reduced. Then the pressure is reduced gradually so as to maintain distillation of essentially pure alcohol and return of the reactants to the reaction mixture. Pressure reduction is continued until an apparent steady state is reached in the distillation column. Often the pressure at the top of the column will be less than 20 mm Hg; as alcohol is formed, it moves up through the column and is not completely condensed at such low pressure, but rather is exhausted through the vacuum pump or collected in a cold trap, if one is used.

These conditions are maintained until there is no evidence of further reaction. The viscosity of the polyester should have leveled off at a maximum value (with no take off of reactants), and the hydroxyl content of the product should have reached a minimum value consistent with the theoretical analysis of the product. Chromatographic analysis or other analytical means may be employed to verify the essential disappearance of alkyl end groups in the polyester reaction mixture.

The time required to complete the reaction depends greatly on the choice of reactants as well as on the hydroxyl content of the product in question, the amount of catalyst used and the degree to which its activity is maintained through exclusion of moisture and oxygen from the reaction mixture. In general, it is expedient to add several charges of catalyst during the vacuum phase of the reaction process, up to a total amount equivalent to 200-250 ppm of stannous 2-ethylhexanoate (60 to 75 ppm tin). In the case of products derived from primary glycols, such as ethylene glycol, with hydroxyl equivalent weights of less than 200, the total process time should be less than about 16 hours with only 30–50 ppm total stannous 2-ehtylhexanoate. Diethylene glycol, 1,4-butanediol, 1,5-pentanediol and 1,6-hexanediol, for example, react more rapidly than ethylene glycol. Products of higher equivalent weights require longer reaction times and/or larger amounts of catalyst. Glycols containing secondary hydroxyl groups, such as propylene glycol and 1,3-butanediol generally require longer reaction periods, and in the case of the latter diol, the reaction temperature should be limited to about 195° C to prevent side reactions.

The hydroxyl terminated polyester glutarates thus obtained contain a residuum of tin and a residuum of carbalkoxy groups. The residuum of tin has been inactivated by the processing so that it no longer has catalytic activity for promoting the reaction of isocyanates with active hydrogen-containing compounds. The residuum of carbalkoxy groups, advantageously, should not exceed about 2 percent, i.e. not more than about 2 percent of the initial carbalkoxy groups have not been transesterified by the polyol. Also, the product should have a low acid number, advantageously, not more than about 3. The products will also be found to have comparatively low melting points, for the most part, below room temperature, and at most not more than a little above room temperature. They also will be found to have unusually long shelf life and when used in polyurethane production, to have essentially unenhanced reactivity towards isocyanates.

The hydroxyl terminated polyester glutarates contemplated above may be represented by the following general formula when dimethyl (or other dialkyl) glutarate is the sole dialkyl carboxylate employed in the reaction:

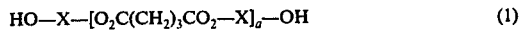

$$HO-X-[O_2C(CH_2)_3CO_2-X]_a-OH \quad (1)$$

where X is a hydrocarbon radical belonging to the aliphatic, cycloaliphatic or al-aromatic-aliphatic classes. (The prefix al- means that the free valences are attached to aliphatic carbon atoms). X may contain certain substituents which do not interfere with preparation of the polyester products nor their subsequent use in preparation of polyurethane intermediates and finished polyurethane compositions. Such non-interfering groups include ether groups, and primary or secondary hydroxyl groups when it is intended that the product have a hydroxyl functionality greater than two. It is important to point out that, in general, the value of $a$ in the formula (I) may vary from 1 to about 30 depending on the intended application of the polyester, and that it is practical and often desirable to incorporate in a single polyester product several types of X's; that is, the polyester may be prepared from a mixture of diols, or a mixture of diols and triols, etc.

The polyesterdiols preferably are derived from the following diol starting materials: ethylene glycol, propylene glycol, 1,3-propanediol, 1,3-butanediol, 1,4-butanediol, 1,5-pentanediol, 2,2-dimethyl-1,3-propanediol, 1,6-hexanediol, and higher poly(methylene) glycols containing up to and including 20 carbon atoms; diethylene glycol and higher poly(oxyethylene) glycols containing up to and including 10 oxyethylene groups; dipropylene glycol and higher poly(oxypropylene) glycols containing up to and including 6 oxypropylene groups; al-cycloalkylenediols, for example, 1,2-,1,3-, and 1,4-bis(hydroxymethyl)cyclohexanes and 1,3-bis (hydroxymethyl)cyclobutane; ac-cycloalkylenediols containing from 4 to not more than 8 carbon atoms; for example, 1,3-bis-cyclobutanediol and 1,3-cyclopentanediol, and al- ac-cycloalkylenediols containing from 4 to not more than 8 carbon atoms, for example, 4-hydroxymethylcyclohexanol and 3-hydroxymethylcyclobutanol, and 1,2-, 1,3-, and 1,4-bis(hydroxymethyl)benzenes, and polyols of the class consisting of 1,1,1-tris(hydroxymethyl)ethane 1,1,1-tris(hydroxymethyl)propane, 1,2,4-butanetriol, glycerol and pentaerythritol.

Ac- means that the hydroxyl is attached to a ring carbon. The term al- ac- means that one hydroxyl is attached to an aliphatic carbon and the other to a ring carbon.

Hydroxyl terminated polyesterpolyols containing the glutarate moiety together with other ester moieties are extremely useful for the preparation of polyurethane intermediates and finished polyurethane compositions. These are, of course, obtained when, in addition to dialkyl glutarates, other dialkyl carboxylates are employed as described above. However, there are several other practical and useful approaches to the preparation of such co-polyester polyols:

(1) By transesterification-equilibration of glutarate-containing polyesterpolyols with other polyols or other polyesterpolyols (products of higher or lower molecular weight can thus be obtained according to the molecular weight of the other polyols or other polyesterpolyols);

(2) By further reaction of the glutarate polyesters with epsilon-caprolactone to produce co-polyesterpolyols of higher equivalent weight (epsiloncaprolactone also can be employed together with dialkyl glutarates in the initial transesterification);

(3) By polyesterification reactions employing glutarate polyesterpolyols as reactants with dibasic acids and/or their anhydrides, such as fumaric (or maleic) acid, succinic acid, adipic acid, pimelic acid, suberic acid, sebacic acid, undecanedioic acid, brassylic acid, and roccellic acid, and bicyclo[2.2.1]hept-2-ene-1,4-dicarboxylic acid, and like cycloaliphatic dicarboxylic acids.

In methods (1) and (2), the reaction conditions are similar to those described above for the preparation of glutarate polyesterpolyols by the process of the invention; these methods are exemplified below. Method (3) involves conventional polyesterification conditions, and also is exemplified below. It should be pointed out that, if the glutatate polyesterpolyol contains only glutarate ester groups and no other polyols are employed in the polyesterification, the resulting product always contains a higher molar concentration of glutarate residues than any other ester residue in the case of products prepared by method 3).

A preferred glutarate polyesterdiol which can be prepared by the above auxiliary methods from epsilon-caprolactone can be represented by the general formula:

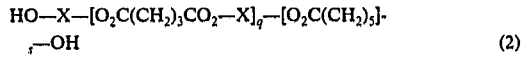

$$HO-X-[O_2C(CH_2)_3CO_2-X]_q-[O_2C(CH_2)_5]_r-OH \quad (2)$$

where, in a single average polyesterdiol molecule, X is as given above but especially a poly(methylene) radical containing 2 to 6 carbon atoms, inclusive, $q = 3$ to 20, inclusive, and the ratio of $q$ to $s$ is at least unity.

Other glutarate polyesterdiols which can be prepared by the auxiliary methods from other dicarboxylic acids can be represented by the general formula:

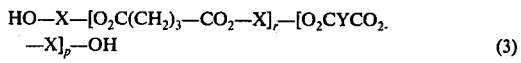

$$\text{HO—X—[O}_2\text{C(CH}_2)_3\text{—CO}_2\text{—X]}_r\text{—[O}_2\text{CYCO}_2\text{—X]}_p\text{—OH} \quad (3)$$

where X is as above, Y is the divalent radical of the other dialkanoic or dialkenoic acid, $p$ is 3 to 20, inclusive, $r$ is 3 to 20 inclusive, and the ratio of $r$ to $p$ is at least unity.

For preparation of hydroxyl terminated glutarate polyesters having average functionalities greater than two, by way of the above procedures, it is preferred that one or more of the aliphatic polyols listed above be employed (in the proper proportion) as a raw material in combination with the preferred diol raw materials described above. Of these, 1,1,1- trimethylolpropane is most often preferred.

The hydroxyl-terminated polyester glutarates whose preparation has been described above are useful for preparation of a wide variety of polyurethane intermediates and finished polyurethane compositions. Such novel and useful derivatives of the polyesters are described below.

ISOCYANATE-TERMINATED GLUTARATE POLYESTER URETHANES

Among the especially useful polyurethane intermediates derived from the above polyesters are the isocyanate-terminated glutarate polyesterurethane prepolymers. These intermediates preferably are prepared by reacting a substantial molar excess of a diisocyanate with hydroxyl terminated polyester glutarate, although in some cases it is useful to employ mixtures of di- and polyisocyanates, or polyesterpolyols in combination with diisocyanates, so as to obtain polyfunctional isocyanate-terminated products.

The linear (difunctional) isocyanate prepolymers are particularly useful in the manufacture of castable polyurethane elastomers and thermoplastically processable polyurethane elastomers, while the polyfunctional isocyanate prepolymers find greatest usage in forms, coatings, and adhesive systems. Other applications will be apparent to those skilled in the art.

The diisocyanates which are preferred for preparation of the isocyanate-terminated prepolymers of the invention are 2,4-tolylene diisocyanate, alone or in admixture with 2,6-tolylene diisocyanate; 4,4'-methylenebis(phenyl isocyanate), alone or in admixture with its 2,4'- and/or 2,2'-isomers; 3,3'-dimethyl-4,4'-diisocyanatobiphenyl; 3,3'-dimethoxy-4,4'-diisocyanatobiphenyl; 4,4'-methylenebis(2-methylphenyl isocyanate); 4,4'-methylenebis(2-methoxyphenyl isocyanate); 1,5-naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; and, 4,4'-methylenebis(cyclohexyl isocyanate). Other useful diisocyanates will be obvious to those skilled in the art.

The preferred polyisocyanates of functionality greater than 2 include those obtained by phosgenation of aniline-formaldehyde resins; 4,4',4''-tris(isocyanatophenyl)-methane; the triisocyanate obtained by reaction of three moles of tolylene diisocyanate with one mole of 1,1,1-tris(hydroxymethyl)propane; and, the triisocyanate obtained by reaction of three moles of hexamethylene diisocyanate with one mole of water.

The compositional range of useful isocyanate-terminated prepolymers derived from hydroxyl terminated polyester glutarates is generally analogous to that of such prepolymers derived from conventional hydroxyl terminated polyesters, and will be known to those skilled in the art. However, certain of the commercially important types of prepolymers used for the manufacture of castable elastomers, thermoplastically processable elastomers and microcellular elastomers, as well as for other polyurethane products considered to be in the high-performance category, exhibit unique, surprising and extremely useful characteristics when derived from polyesters containing the glutarate moiety. The most important types of such prepolymers are prepared by reaction of about two moles of 2,4-tolylene diisocyanate, or from about three to about eight moles of 4,4'-methylenebis(phenyl isocyanate), with one mole of hydroxyl terminated polyester glutarate.

Optimum elastomer physical properties are obtained from these prepolymers when the glutarate polyesterdiol is derived from the unsubstituted poly(methylene) glycols containing at least 2 and not more than 6 carbon atoms. Glutarate-carboxylate co-polyester polyols containing adipate, azelate, 6-oxycaproate and other straight-chain alkanoate moieties together with poly(methylene) moieties containing at least 2 and not more than 6 methylene units also provide excellent elastomer physical properties. These co-polyester glutarate-carboxylate compositions are derived in accordance with the several above-mentioned methods for preparation of glutarate-carboxylate co-polyesterpolyols.

When conventional adipate, azelate and 6-oxycaproate polyesters are used in the preparation of prepolymers analogous to the above glutarate-containing prepolymers, the prepolymers thus obtained usually are crystalline solids with melting points above normal room temperature. However, when the conventional dicarboxylate moieties are replaced, on a molar basis, by from about 40 to 100 percent glutarate moieties, the resulting prepolymers mostly do not solidify at room temperature. Furthermore, many of the glutarate-containing prepolymers do not crystallize upon further cooling, but instead eventually set to a glassy state. This feature is a great practical advantage over the conventional products because the processing of polyurethane end products is simplified through elimination of the step of heating and agitating the containers of prepolymers, which must be done if crystallization has occurred.

The absence of the tendency to crystallize which is exhibited by the glutarate-containing prepolymers also provides certain performance advantages in derived elastomers, such as improved low-temperature flexibility and improved flex fatigue resistance. Some of the most widely used conventional products are deficient in these respects due to excessive elastomer crystallinity imparted by their polyester segments.

A particularly noteworthy advantage of the glutarate-containing prepolymers of 4,4'-methylenebis(phenyl isocyanate) is that, in addition to being liquid at normal room temperature, the glutarate moiety evidently imparts to the prepolymer the ability to dissolve substantial amounts of the dimer of 4,4'-methylenebis(phenyl isocyanate). In the past, castable elastomer systems based on prepolymers of this diisocyanate, although providing outstanding elastomer physical properties under optimum manufacturing conditions, have enjoyed only limited acceptance due to the sensitivity of such prepolymers to heat cycling during storage and handling. These prepolymers generally contain unreacted diisocyanate (dissolved in the prepolymer), and this free diisocyanate tends to form insoluble dimer even in the course of normal storage conditions.

In a typical casting operation, the conventional solid prepolymers first must be melted in their containers, and then transferred to a casting machine holding tank. Since the conventional prepolymers are crystalline solids, a considerable amount of heat must be supplied to account for both the heat of fusion and the heat capacity of the liquid product once melting has occurred. Because these prepolymers are heat-sensitive, high surface temperatures are not satisfactory, and consequently special apparatus and/or long heat-up times are required in order to minimize dimerization as well as decomposition through reaction of isocyanate groups with urethane groups on the prepolymers. Even when the conventional prepolymers are stored and melted under optimum conditions, the dimer concentration often increases beyond the limit of its solubility in the prepolymer, yielding a heterogeneous prepolymer which provides variable and inferior elastomer properties for reasons well known to those experienced in the art.

The liquid glutarate-containing prepolymers of 4,4'-methylenebis(phenyl isocyanate) provided by many of the glutarate-containing linear polyesterdiols said above to be preferred for this application obviate the difficulties and disadvantages of melting fused solid prepolymers as well as the more serious problem of insoluble diisocyanate dimer, since the dimer is markedly more soluble in these prepolymers than in conventional prepolymers. Even when the dimer concentration is so high as to appear as a dispersion of finely divided solid in the prepolymers of the invention at room temperature, the dimer usually dissolves completely at or below 65° C, which temperature is well below the normal preheat temperature for casting operations. Furthermore, these prepolymers are observed to give essentially the theoretical analysis for isocyanate content, indicating that the dimer not only dissolves, but dissociates to free monomeric diisocyanate.

Finally, the liquid glutarate-containing prepolymers of the invention provide still another important advantage over conventional prepolymers of this type in that many of them are low enough in viscosity at normal room temperature to be transferred directly, without prior heating, to casting machine holding tanks. In this way not only is the time-temperature history of the prepolymers minimized, but the problems arising from exposure of hot prepolymer to atmospheric moisture during transfer to the casting machine are eliminated. This last problem also is well known to those skilled in the art.

The combination of handling advantages and greater stability and reliability of these novel prepolymers in actual manufacturing operations, together with the improved combinations of physical properties offered by many, represent the most significant advance in the field of castable elastomer systems based on 4,4'-methylenebis(phenyl isocyanate) since the advent of these systems more than 20 years ago.

For preparation of glutarate-containing prepolymers of 4,4'-methylenebis(phenyl isocyanate), the preferred glutarate polyesterdiol average molecular weight range is from about 1000 to about 3000, with the range 2000-2500 being still more preferred. Variation in the mole ratio, diisocyanate:polyesterdiol provides variable elastomer hardness with given curatives. The preferred ratio is from about 3:1 to about 8:1. With typical diol or diol/triol curatives known in the art, this range provides for elastomer hardnesses of from 60 Shore A or less to 70 Shore D or more.

For preparation of 2,4-tolylene diisocyanate glutarate-containing prepolymers, the preferred glutarate polyesterdiol average molecular weight range is from about 500 to about 3000, with 600-2500 being more preferred. In this series, elastomer hardness most often is controlled by variation of the glutarate polyesterdiol molecular weight while keeping the diisocyanate: polyesterdiol mole ratio from about 1.95:1.00 to about 2.05:1.00. Higher ratios are not preferred in the interest of minimizing the concentration of free, dissolved 2,4-tolylene diisocyanate in the prepolymers. This diisocyanate is particularly toxic, and also provides short pot lives if present in excessive amounts when typical diamine curatives are employed in preparation of the cast elastomers.

The above discussion discloses various areas of composition of the isocyanate-terminated glutarate-containing prepolymers of the invention which offer particularly noteworthy advantages over conventional prepolymers in the field of castable elastomers. Many other prepolymer compositions containing the glutarate moiety are useful in this and other polyurethane applications, and will now be apparent to those skilled in the art.

CHAIN EXTENDERS AND CURATIVES DERIVED FROM HYDROXYL TERMINATED GLUTARATE POLYESTERS

The hydroxyl terminated glutarate-containing polyesters of the invention may be used in several other ways (besides in the preparation of isocyanate-terminated prepolymers), to provide novel and useful polyurethane intermediates. Among the novel intermediates now found to be particularly useful are several types of curatives and chain extenders for various polyurethane systems. This series of curatives and chain extenders consists of three types:

1. Solutions of aromatic diamine curatives or lower molecular weight polyol curatives in glutarate-containing hydroxyl terminated polyesters of the invention, which solutions do not solidify or undergo phase separation at normal room temperatures;

2. Glutarate-containing, hydroxyl terminated polyesters of the invention which have been chain-extended with substantially less than equimolar quantities of diisocyanates so as to obtain hydroxyl terminated glutarate polyester urethanes of less than about 6000 average molecular weight. (These hydroxyl terminated glutarate polyester urethanes are prepared the same way as the isocyanate-terminated ones, except that the proportion of isocyanate is less);

3. Solutions of aromatic diamine curatives or lower molecular weight polyol curatives in the above hydroxyl terminated glutarate polyester urethanes, which do not solidify or undergo phase separation at normal room temperatures.

Solutions of aromatic primary dimines or lower molecular weight polyol curatives in the above-mentioned hydroxyl terminated glutarate polyesters and hydroxyl terminated glutarate polyester urethanes are especially useful as curatives for the isocyanate-terminated glutarate polyester urethane prepolymers of the invention, as well as for conventional isocyanate-terminated polyester urethane prepolymers. These prepolymers curative systems are employed in making castable elastomers, microcellular elastomers, coatings, etc.

Although solutions of aromatic diamines in conventional hydroxyl terminated polyesters have heretofore been proposed for the production of elastomers, such solutions (or dispersions) have the disadvantage that upon cooling to normal room temperature, they become crystalline solids or crystalline solids dispersed in liquids. What happens is that the aromatic diamine crystallizes from its polyester solution, and in many cases the polyester crystallizes as well. In order to utilize such curatives, the entire contents of each container must be heated approximately to the melting point of the diamine and agitated until a homogeneous solution is obtained before any portion of the contents can be removed.

It has now been found that hydroxyl terminated glutarate containing polyesters of the invention are excellent solvents for certain of the diamines generally preferred as curatives for castable elastomers, microcellular elastomers and high-resiliency foams. Such diamines include 4,4'-methylenebis(2-chloroaniline); 4,4'-methylenebis(2-methoxycarbonylaniline); 4,4'-methylenebis(2-methylaniline); 4,4'-methylenebis(2-methoxyaniline); 4,4'-methylenedianiline, alone or in admixture with its 2,4'- and/or 2,2'-isomers; 2,2'-thiodianiline; and the like.

In many cases, 40 percent or more of the diamine can be dissolved in the polyester to provide a true liquid solution at room temperature. Often, such solutions do not undergo solidification or phase separation upon further cooling (as might be experienced in the course of shipping or storage during cold weather). The liquid curative usually can be transferred directly from its container without prior heating above normal room temperature. This is a great advantage over the conventional types of polyester diamine curatives, which must first be heated to the melting point of the diamine and then agitated.

The preferred diamines are those listed above, mixtures thereof, and also various mixed diamines obtained by acid-catalyzed condensation of mixtures of aniline and/or ortho-substituted anilines with formaldehyde. In the case of ortho-substituted anilines, the substituent must be essentially inert toward aromatic isocyanates under ordinary polymerization conditions employed in the preparation of polyurethane/urea compositions. Such inert substituents include lower alkyl groups, chloro, bromo, alkoxy, alkoxycarbonyl and others obvious to those skilled in the art.

Preferred hydroxyl terminated polyesters are, by virtue of the properties imparted to derived polyurethane compositions, those whose average compositions are represented by the formula

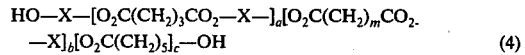
(4)

where X is as given above but preferably is an unsubstituted poly(methylene) radical containing 2 to 6 carbon atoms, inclusive, the 2,2'-oxydiethylene radical, or the 2,2'-dimethyltrimethylene radical, or mixtures of such radicals within individual molecules of the product; $a = 1$ to 30, inclusive; $m = 2$ to 8, inclusive; $b = 0$ to $a$; $c = 0$ to $a$; $b + c$ is not greater than $a$, that is, the ratio of $a$ to $b$ plus $c$ is at least unity. Also, in the preferred embodiment X may include up to an average of about one 3-ethyl-3-hydroxymethyl-1,5-dioxapentamethylene radical per average polyester molecule so as to provide an average hydroxyl functionality ranging from two up to about three. Other useful compositions also now will be apparent to those skilled in the art.

The preferred hydroxyl equivalent weight range of these hydroxyl terminated glutarate polyesters is from 110 to about 2000, with the range 400–1300 being still more preferred. The preferred percentage diamine in the polyester diamine solution is from 10 to 65, with 25–50 percent diamine being more preferred.

These diamine/hydroxyl terminated polyester curatives essentially represent convenient alternatives to ordinary diamine curatives for polyester urethane systems, and offer the advantages of handling liquids instead of solids in the cases of most of the diamines. In addition, they offer the advantage of minimizing alleged toxicity hazards associated with some of the diamines. In comparison with the physical properties imparted to derived polyurethane compositions by the diamines, the polyester diamine solutions tend to impart better low temperature flexibility and improved flex fatigue resistance, together with a small reduction in hardness or stiffness. The pot lives of typical formulated systems also are longer than those obtained using the corresponding diamines alone as curatives. Also, the curative has higher equivalent weight than the diamine curative. This provides prepolymer curative ratios closer to unity, which in turn improves metering accuracy, facilitates mixing, and increases mixing machine output rate.

Similarly, the hydroxyl terminated, diisocyanate chain-extended glutarate-containing polyester urethanes referred to above also are useful solvents for the above-mentioned diamines, and offer several additional advantages. For example, many diamines which are only slightly soluble in the hydroxyl terminated polyesters of the invention are much more soluble in the hydroxyl terminated, diisocyanate-extended products. Furthermore, the urethane groups contained in these modified polyesters tend to impart to derived polyurethane compositions some of the hardness lost when unmodified polyesters are employed as solvents for the diamines.

Preferred hydroxyl terminated glutarate polyester urethanes are obtained by reacting up to about 0.8 equivalents of tolylene diisocyanate or methylenebis(phenyl isocyanate) with 1.0 equivalents of a hydroxyl terminated glutarate polyester of the invention, for example, one from the group represented by formula (4) with the additional limitation that the equivalent weight of the starting polyester, the average functionality of the polyester, and the ratio diisocyanate:polyester are chosen so as to obtain products of 6000 or lower average molecular weight. Products with molecular weights of 4000 or less are more preferred.

Preferred diamine curatives are the same as those mentioned previously, and the preferred concentration of diamine curative in modified polyesters is from 20 to about 75 percent, with 30–60 percent being still more preferred.

The diamine curatives are particularly of advantage for the chain extension or curing of 2,4-tolylene diisocyante-terminated polyester urethane. It is sometimes desirable, therefore, particularly with 4,4'- methylenebis(phenyl isocyanate)-terminated polyesterurethanes, to substitute the aromatic diamine curative by a lower molecular weight polyol curative. The substitution can be made on an equivalent weight to equivalent weight basis. Suitable such lower molecular weight polyolcuratives include polymethylene glycols up to and including hexane-1,6-diol, diethylene glycol, triethylene glycol, propylene glycol, dipropylene glycol, 1,1,1-tris(hydroxymethyl)ethane, 1,1,1-tris(hydroxymethyl)propane, 1,2,4-butanetriol, 1,2,6-hexanetriol, and glycerol.

Finally, the hydroxyl terminated glutarate polyester urethanes of the invention are, by themselves, useful curatives, chain extenders and resin components for a wide range of polyurethane compositiions, including castable elastomers, thermoplastically processable elastomers, foams, microcellular elastomers, adhesives, coatings, etc. Relative to the unmodified hydroxyl terminated polyesters of the invention, these intermediates generally impart greater hardness and stiffness to polyurethane compositions. They are especially useful as curatives for castable elastomers when lower hardness is desired than would be obtained, in a given system, from diamine curatives or conventional low molecular weight diols and triols. When employed in the resin component of microcellular elastomer and foam systems, in place of conventional hydroxyl terminated polyesters, they often improve the compatibility of resin components which tend to be incompatible, such as resins containing 1,4-butanediol as a principal chain extender. Many other applications of these intermediates in polyurethane systems will be obvious to those skilled in the art.

POLYURETHANE COMPOSITIONS DERIVED FROM HYDROXYL TERMINATED POLYESTERS CONTAINING THE GLUTARATE MOIETY

A great variety of especially useful applications of the glutarate-containing hydroxyl terminated polyesters of the invention in polyurethane systems, including several unique advantages derived from the use of these polyesters and their derivatives, have been diclosed in the above. The range of compositions contemplated obviously is very large. In the field of polyurethane compositions, it is generally the case that it is often advantageous to employ compositions containing the glutarate moiety, for reasons detailed above, the seldom disadvantageous to do so.

Due to its low molecular weight, the glutarate moiety tends to increase the ester content of a given polyester urethane composition when used as a replacement for conventional ester moieties such as the adipate, 6-hydroxycaproate and azelate moieties. The higher ester content improves the resistance toward certain solvents while lessening the hydrolysis resistance. However, within the scope of the invention it is straightforward and practical to utilize glutarate co-polyester compositions which provide better hydrolysis resistance than any of the commercially available products, should this property be of particular concern.

In comparison with widely used adipate, azelate and 6-hydroxycaproate moieties, the glutarate moiety tends to reduce the crystallinity of the polyester segments of polyurethane compositions. This, in turn, improves certain flexibility, low temperature and set characteristics. These improved characteristics provide the opportunity for new applications of such polyester urethane compositions, where conventional compositions have been marginally acceptable or unacceptable in the past. Such new applications will be apparent to those skilled in the art.

It is to be understood that the invention is not to be limited to the exact details of operation or structure shown and described as obvious modifications and equivalents will be apparent to one skilled in the art.

PREPARATION OF HYDROXYL TERMINATED GLUTARATE POLYESTERS

EXAMPLE 1

Dimethyl glutarate (2,253 g) and diethylene glycol (1,644 g) were charged into a 5-liter Pyrex glass reaction flask equipped with electric heating mantle, glass agitator, thermometer, and fractional distillation assembly including packed column, distillation head and vacuum receiver. Stannous 2-ethylhexanoate(0.15 ml) was added and the mixture was heated with rapid agitation to 170° C, at which temperature methanol began to distill. The heating rate and reflux ratio were adjusted to keep the vapor temperature in the distillation head at 65° C, while the temperature of the reaction mixture was increased to 215° C at atmospheric pressure over a 5-hour period. When the distillation of methanol had nearly stopped, the pressure was reduced gradually during two hours while the head temperature was kept at the boiling point of methanol. When the head temperature decreased below room temperature, the vacuum receiver was closed off and methanol was collected in a cold trap ahead of the vacuum pump. An additional 0.10 ml stannous 2-ethylhexanoate was added and the reaction mixture was held at 210°-215° C for 12 hours at 15-20 mm Hg. The combined distillates from the vacuum receiver and cold trap weighed 889 g, and the resulting bis(hydroxyethyl) glutarate was a dark, viscous liquid at room temperature, having an acid number of 0.25 and a hydroxyl number of 53.9, which corresponds to an average molecular weight of 2,072. It had a residuum of tin and a residuum of carbomethoxy groups not greater than 2 percent. The residuum of tin is still active to promote transesterification but is inactive, due to the processing, to catalyze the reaction of isocyanate with active hydrogen containing compounds.

In place of diethylene glycol there may be substituted triethylene glycol, tetraethylene glycol, hexaethylene glycol, and like higher polyethylene glycols containing up to and inclduing 10 oxyethylene groups, dipropylene glycol, tripropylene glycol, tetrapropylene glycol, and higher polypropylene glycols containing up to and including 6 oxypropylene groups. Also, a minor part of the dimethyl glutarate can be replaced by dimethyl esters or other lower alkyl esters of fumaric (or maleic) acid, succinic acid, adipic acid, pimelic acid, suberic acid, azelaic acid, sebacic acid, undecanedioic acid, brassylic acid, roccellic acid, and bicyclo[2.2.1]hept-2-ene-1,4-dicarboxylic acid, and like cycloalphatic dicarboxylic acids.

EXAMPLE 2

The following reaction was carried out in a 50-gallon stainless steel reaction system analogous to the glass reaction system of Example 1. The (jacketed) reactor was heated with mineral oil whose temperature could be controlled at any level up to 240° C:

Dimethyl glutarate (211.4 pounds) and ethylene glycol (163.0 pounds) were charged to the reactor. This mixture was heated rapidly, with good agitation, to 170°–175° C. At this temperature methanol began to distill slowly from the reaction mixture together with the small amount of water present in the starting materials. After 30 minutes, 5 ml stannous 2-ethylhexanoate was injected into the reaction mixture, and the temperature of the reaction mixture was increased gradually to 210° C while methanol was distilled under conditions of partial reflux at atmospheric pressure. When methanol ceased to distill, the pressure was reduced gradually to 20 mm Hg while maintaining the reaction mixture at 210°–215° C, and an additional 5 ml stannous 2-ethylhexanoate was added. When the temperature at the top of the distillation column decreased to below room temperature, the vacuum receiver was closed off from the system so that the last portion of methanol formed was exhausted through the vacuum pump. After a total reaction time of 16 hours, gas chromatographic analysis of the reaction product indicated bis(hydroxyethyl)-glutarate to be the principal reaction product; some free ethylene glycol and higher polyester oligomers also were present. Only traces of methyl hydroxyethyl glutarate and of higher oligomeric monomethyl-terminated, monohydroxyethyl-terminated glutarates were detected. The clear-yellow, crude bis(hydroxyethyl)glutarate was found to have an acid number of 0.2 and a hydroxyl equivalent weight of 118, a residuum of tin, and of carbomethoxy groups less than 2 percent. The residuum of tin is still active to promote transesterification but is inactive, due to the processing, to catalyze the reaction of isocyanate with active hydrogen containing compounds.

In place of the ethylene glycol there may be substituted other alkylene glycols up to and including 20 carbon atoms, for example, vicinal glycols such as 1,2-propanediol, 1,2- and 2,3-butanediols, 1,2-, 2,3-, and 3,4-hexanediols, or non-vicinal alkylene glycols, such as trimethylene, tetramethylene, pentamethylene, and hexamethylene glycols. Or there may be substituted al-cycloalkylenediols that is, cycloalkylenediols in which the hydroxyl groups are attached to aliphatic carbon atoms, or ac-cycloalkylenediols, that is, cycloalkylenediols in which the hydroxyl groups are attached directly to the cycloaliphatic ring, or al- ac-cycloalkylenediols, that is, cycloalkylanediols in which one hydroxyl group is attached to aliphatic carbon and the other is attached to the ring carbon, for example, 1,4-bis(hydroxymethyl)cyclohexylhexane, 4-hydroxymethylcyclohexanol, or cyclohexane-1,4-diol, and the like, ranging up from 1,3-cyclobutanediol. Also, there may be substituted bis(hydroxylmethyl)benzenes and polyols of higher functionality, such as 1,1,1-tris(hydroxymethyl)ethane, 1,1,1-tris(hydroxymethyl)propane, 1,2,4-butanetriol, glycerol, and pentaerythritol. Also, there may be substituted the polyalkylene glycols mentioned in Example 1.

EXAMPLE 3

Following the procedure of Example 1, 2,747 g dimethyl glutarate was polytransesterified with 1,146 g ethylene glycol. Three 0.15 ml portions of stannous 2-ethylhexanoate were employed to catalyze the reaction; the first portion was added together with the reactants, the second after pressure had been reduced to 50 mm Hg with the reaction mixture at 210°–215° C, and the third after the reaction mixture had been held for 6 hours at 20–25 mm Hg and 210°–215° C. The total reaction time, after distillation of methanol first began at 170° C, was 32 hours. A total of 1,085 g distillate was collected in the vacuum receiver and cold trap. The product was a dark brown liquid with a viscosity of 10,150 centipoises at 24° C and a density of 1.24 g/ml. Its acid number and hydroxyl equivalent weight were, respectively, 0.24 and 979.3. This corresponds to an average molecular weight of 1,950. It contained a residuum of tin and a residuum of carbomethoxy groups less than 2 percent. The residuum of tin is still active to promote transesterification but is inactive, due to the processing, to catalyze the reaction of isocyanate with active hydrogen containing compounds.

EXAMPLE 4

Following the procedure of Example 1, crude bis(6-hydroxyhexyl) glutarate was prepared by reaction of 1,891 g 1,6-hexanediol with 1,288 g dimethyl glutarate, using 0.15 ml of stannous 2-ethyl hexanoate as catalyst. The total reaction time after the first distillation of methanol was 19 hours, and the total distillate collected was 506 g. Upon standing at room temperature for several days, the product had partially crystallized, but melted just above room temperature. It had an acid number of 0.22 and a hydroxyl equivalent weight of 164.3. It contained a residuum of tin and a residuum of carbomethoxy groups less than 2 percent. The residuum of tin is still active to promote transesterification but is inactive, due to the processing, to catalyze the reaction of isocyanate with active hydrogen containing compounds. Upon standing at room temperature for several days, it partially crystallized.

EXAMPLE 5

The product of Example 4 was heated and agitated at 60°–70° C until a homogeneous liquid was obtained. Then 2,342 g of it was charged to the reaction apparatus of Example 1, together with 515 g of adipic acid. This mixture was heated rapidly with good agitation to 150° C, without further addition of catalyst, at which temperature water began to distill at atmospheric pressure. The heating rate and variable reflux ratio were adjusted so that the vapor temperature in the distillation head did not exceed 101° C, and the temperature of the reaction mixture was increased to 210° C over a 4-hour period. The temperature was held at 210°–215° C for an additional 30 minutes, while the rate of distillation of water gradually diminished. Then the pressure was reduced gradually over a 90-minute period to 50 mm Hg, and the reflux ratio was adjusted so that essentially all hexamethylene glycol was returned to the reaction flask and nearly pure water was taken off as distillate. The pressure was gradually reduced to 25–30 mm Hg and the vacuum receiver closed off so that water distilled directly into the cold trap ahead of the vacuum pump. These conditions were maintained for an additional 16 hours. Then the product was cooled to below 150° C under vacuum and nitrogen was introduced to bring the system to atmospheric pressure.

EXAMPLE 6

Following the procedure of Example 1, the transesterification of 1,610 g dimethyl glutarate and 2,683 g 1,1,1-tris(hydroxymethyl)propane was carred out with 0.15 ml of stannous 2-ethylhexanoate as catalyst. The total amount of methanol collected was 636 g. The product was a dark yellow, viscous liquid with an acid number of 0.20 and a hydroxyl equivalent weight of 91.6. It contained a residuum of tin and a residuum of carbomethoxy groups less than 2 percent. The residuum of tin is still active to promote transesterification but is inactive, due to the processing, to catalyze the reaction of isocyanate with active hydrogen containing compounds.

EXAMPLE 7

(a) Following the procedure of Example 3 on a larger scale, crude bis(hydroxyethyl) glutarate was prepared by reaction of 9,034g dimethyl glutarate with 6,966g ethylene glycol in a 22-liter glass reaction system. Fifty parts per million (0.8 g) of stannous 2-ethylhexanoate was employed as catalyst for the transesterification. The product was found to have an acid number of 0.30 and a hydroxyl equivalent weight of 115. It had a residuum of tin and a residuum of carbomethoxy groups not greater than 2 percent.

(b) To 12,694 g of the crude bis(hydroxyethyl) glutarate thus produced was added 9,014 g of azelaic acid. A polyesterdiol then was prepared using the general reaction conditions of Example 5. No additional catalyst was employed. The total reaction time after initial distillation of water was 23 hours, and 1,695 g of distillate was collected. The product was a dark, viscous liquid with an acid number of 1.22 and a hydroxyl number of 56.9, which corresponds to an average molecular weight of 1,930. It showed no signs of crystallization after standing for two months at room temperature.

EXAMPLE 8

Following the procedure of Example 7b, a polyestertriol was prepared by reaction of 1,690 g of the bis(hydroxyethyl) glutarate of Example 7a and 134.2 g of 1,1,1-tris(hydroxymethyl)propane with 1,452 g of azelaic acid. The total water distillate was 273 g. The product was a dark, viscous liquid with an acid number of 0.55 and a hydroxyl number of 55.6, which corresponds to an average molecular weight of 2,997.

EXAMPLE 9

Following the procedure of Example 7b, a polyestertriol was prepared by reaction of 1,350 g of bis(hydroxyethyl) glutarate of Example 7a, 636 g of 2,2-dimethyl-1,3-propanediol and 1,346 g of adipic acid (instead of azelaic). No esterification catalyst was employed, and 328 g of distillate was collected. The product was a dark, viscous liquid at room temperature, with an acid number of 1.05 and a hydroxyl number of 113.2, which corresponds to an average molecular weight of 982.

EXAMPLE 10

Following the procedure of Example 7b, a glutarateazelate copolyesterdiol was prepared by reaction of 2,261 g of azelaic acid with 5,168 g of the crude bis(hydroxyethyl) glutarate of Example 2. The liquid polyester was relatively low in viscosity. It was found to have an acid number of 0.76 and a hydroxyl number of 162, which corresponds to a number average molecular weight of 689.

EXAMPLE 11

Following the procedure of Example 7b, a glutarateazelate copolyesterdiol was prepared by reaction of 2,392g azelaic acid with 4,860g of crude bis(hydroxyethyl) glutarate of Example 2. This liquid polyesterdiol was slightly more viscous than the product of Example 10. It was found to have an acid number of 0.89 and a hydroxyl number of 130, which corresponds to a number average molecular weight of 857.

EXAMPLE 12

Following the procedure of Example 7b, a glutarateazelate copolyesterdiol was prepared by reaction of 2,991 g azelaic acid with 4,777 g of the crude bis(hydroxyethyl) glutarate of Example 2. This product was more viscous than the polyesterdiol of Example 11. It was found to have an acid number of 1.02 and a hydroxyl number of 68.2, which corresponds to a number average molecular weight of 1,621.

In the products of Examples 7b, and 8 through 12, the catalytic activity of the residuum of tin was destroyed as in Example 5.

In place of azelaic and adipic acid in the above examples, there can be substituted fumaric (or maleic) acid, succinic acid, pimelic acid, suberic acid, sebacic acid, brassic acid, brassylic acid, and rocellic acid. Also, in place of the other acid there can be substituted the anhydrides and lower alkyl esters thereof. Also, the other acid can be substituted by hydroxyl terminated polyesters of such acids, or a mixture of such acids and a polyol can be used.

EXAMPLE 13

Using the equipment and general procedure of Example 1, a mixture of 1,007 g of 1,4-butanediol, 1,317 g dimethyl glutarate and 900 g epsilon-caprolactone was polytransesterified to produce a polyesterdiol. Stannous 2-ethylhexanoate (0.15 ml) was employed as catalyst. After the pressure had been reduced to 30 mm Hg with the reaction mixture at 210°–215° C, an additional 900 g of epsilon-caprolactone was charged and the reaction was continued at 20–25 mm Hg and 210°–215° C for 12 hours longer. The total methanol distillate was 520 g. The product was a dark brown, moderately viscous liquid with an acid number of 0.32 and a hydroxyl number of 91.5, which corresponds to an average molecular weight of 1,222. It had a residuum of tin and a residuum carbomethoxy groups not greater than 2 percent. The residuum of tin is still active to promote transesterification but is inactive, due to the processing, to catalyze the reaction of isocyanate with active hydrogen containing compounds.

EXAMPLE 14

A 5-liter Pyrex glass reaction flask equipped with stainless steel agitator, thermometer, electric heating mantle, dropping funnel and connection to a mechanical vacuum pump was used for preparation of the prepolymer (isocyanate-terminated polyester urethane), of this example, as well as for the prepolymers of several of the following examples.

To the flask was added 344 g of 2,4-tolylene diisocyanate. The pressure was reduced to approximately 100 mm Hg, and the charging of 2,014 g of the polyesterdiol of Example 3 was begun, together with gentle heating and vigorous agitation. About one-third of the polyesterdiol had been charged when the temperature reached 65° C, and a mild exotherm was noted. The heating mantle was removed when the temperature reached 70° C, and the polyesterdiol charging rate was controlled so as to keep the temperature of the reaction mixture at 70°–75° C. After two hours all of the polyesterdiol had been charged. The heating mantle was replaced and the temperature increased to 80°–85° C and held at that level for 30 minutes. Then the heating mantle was again removed and the product allowed to cool with the pressure reduced to 20-25 mm Hg. When the product had cooled to 60° C, the agitator was turned off to facilitate degassing for 10 minutes, and then dry nitrogen gas was introduced to bring the system to atmospheric pressure. The product was cooled and stored under nitrogen. It was a yellow, viscous liquid at room temperature, and was found to have an isocyanate equivalent weight of 1,219 (theoretical value, 1,209).

EXAMPLE 15

Following the procedure of Example 14, an isocyanate-terminated polyester urethane was prepared by reaction of 1,720 g of 2,4-tolylene diisocyanate with 1,150 g of crude bis(hydroxyethyl) glutarate (prepared in accordance with the procedure of Example 7a and having a hydroxyl equivalent weight of 115.0). The reaction was very exothermic, and four hours was required for charging of the bis(hydroxyethyl) glutarate. The product was an extremely viscous liquid upon cooling to room temperature, and after several days it had become a hard, semi-crystalline mass (glass). It was found to have an isocyanate equivalent weight of 298.13 (theoroetical value, 294.3).

EXAMPLE 16

Following the procedure of Example 14, 344 g of 2,4-tolylene diisocyanate was reacted with 1,950 g of the polyesterdiol of Example 3. The product was much darker in color than the analogous product of Example 14, but appeared to be of the same viscosity. It was found to have an isocyanate equivalent weight of 1,184 (theoretical value, 1,176).

EXAMPLE 17

Following the procedure of Example 14, 516 g of 2,4-tolylene diisocyanate was reacted with 2,703 g of a polyesterdiol prepared by the procedure of Example 7a and 7b and having an average molecular weight of 1,802. (It was prepared from bis(hydroxyethyl) glutarate with a hydroxyl equivalent weight of 115.0, and azelaic acid). The resulting prepolymer had an isocyanate equivalent weight of 1,134 (theoretical value, 1,100). It was a dark liquid, with a viscosity of 128,000 centipoises at 24° C, and it exhibited no tendency to solidify after three months of storage at room temperature.

EXAMPLE 18

Following the procedure of Example 14, a prepolymer was prepared from 800 g of 4,4'-methylenebis(phenyl isocyanate) and 2000 g of the polyesterdiol employed in Example 17, in which had been previously dissolved 50 ppm of adipoyl chloride. The isocyanate first was melted at 45°-50° C at 100 Hg, and then the heating mantle was removed and the polyesterdiol charged slowly so as to control the temperature of the reaction mixture in the range 65°-70° C. After the polyesterdiol charge was completed, the pressure was reduced to 25 mm Hg and the temperature was increased to 75° C for 30 minutes. Then the product was allowed to cool under vacuum with slow agitation. The product was a dark viscous, but pourable liquid at room temperature, with an isocyanate equivalent weight of 685 (theoretical value, 670). Even though the molten isocyanate starting material had contained a substantial amount of insoluble dimer, the prepolymer remainded a homogeneous liquid after standing over six months at 20°-25° C, and did not crystallize or undergo phase separation upon storage at 3° C or at −20° C, or significant change in analysis.

EXAMPLE 19

(a) Using the 22-liter reaction system of Example 7a, crude bis(hydroxyethyl) glutarate was prepared by polytransesterification of 9,034 g of dimethyl glutarate with 6,966 g of ethylene glycol, using two 0.25 g portions of stannous acetate to catalyze the reaction. The product was found to have a hydroxyl equivalent weight of 118 and an acid number of 0.27

(b) Following the procedure of Example 7b a glutarate/azelate copolyesterdiol was prepared from 10,963 g of the above crude bis(hydroxyethyl) glutarate and 7,228 g azelaic acid. This product was liquid at 25° C, with a viscosity of 20,500 cps. It was found to have a hydroxyl number of 55.7 and an acid number of 1.05. The combined distillates from the distillate receiver and vacuum trap weighed 1,359 g. This polyesterdiol was employed in the preparation of several chemical intermediates found to be of particular value for preparation of high-performance polyurethane elastomers.

EXAMPLE 20

Following the procedure of Example 18, an isocyanate-terminated prepolymer was prepared from 2000 g of the polyesterdiol of Example 19b, to which 50 ppm of adipoyl chloride had been added, and 1,600 g of 4,4'-methylenebis(phenyl isocyanate). The product had an isocyanate equivalent weight of 341, and a viscosity of 10,000 cps at 25° C. When stored in a glass container under a nitrogen blanket, it exhibited no tendency to solidify or crystallize after five months storage at room temperature, and after this storage period the isocyanate equivalent weight had increased by only an insignificant amount to 346.

EXAMPLE 21

Following the procedure of Example 14, using similar but smaller equipment, an isocyanate-terminated prepolymer was prepared from 172 g 2,4-tolylene diisocyanate and 989 g of the polyesterdiol of Example 7b. The product was a dark yellow liquid at 25° C with a viscosity of 135,000 cps. It was found to have an isocyanate equivalent weight of 1,194.

EXAMPLE 22

Following the procedure of Example 14, an isocyanate-terminated prepolymer was prepared by reaction of 1,723 g of the product of Example 10 (2.50 mole) with 870 g 2,4-tolylene diisocyanate (5.00 mole). The resulting prepolymer was found to have an isocyanate equivalent weight of 530 (theoretical value, 519) and a viscosity of 132,000 cps at 25° C.

EXAMPLE 23

Following the procedure of Example 14, an isocyanate-terminated prepolymer was prepared by reaction of 2,143 g of the product of Example 11 (2.50 mole) with 870 g 2,4-tolylene diisocyanate (5.00 mole). The resulting prepolymer was found to have an isocyanate equivalent weight of 614 (theoretical value, 603) and a viscosity of 105,000 cps at 25° C.

EXAMPLE 24

Following the procedure of Example 14, an isocyanate-terminated prepolymer was prepared by reaction of 2,432 g the product of Example 12 (1.5 mole) with 522 g 2,4-tolylene diisocyanate (3.00 mole). The resulting prepolymer was found to have an isocyanate equivalent weight of 990 (theoretical value, 985) and a viscosity of 121,000 cps at 25° C.

In place of the 2,4-tolylene diisocyanate there can be used a mixture of 2,4-tolylene diisocyanate and its 2,6-isomer, 4,4'-methylenebis(phenyl isocyanate) in admixture with its 2,4'- and/or 2,2'-isomers; 3,3'-dimethyl-4,4'-diisocyanatobiphenyl; 3,3'-dimethoxy-4,4'-diisocyanatobiphenyl; 4,4'-methylenebis(3-methoxyphenyl isocyanate); 1,5-naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; 4,4'-methylenebis(cyclohexyl isocyanate), 4,4', 4''-tris(isocyanatophenyl)methane alone or in admixture with other isocyanates obtained by the phosgenation of aniline-formaldehyde resins; the triisocyanate obtained by the reaction of 3 mols of tolyene diisocyanate with 1 mol of 1,1,1-tris(hydroxymethyl)propane; and, the triisocyanate obtained by the reaction of 3 mols of hexamethylene diisocyanate with one mol of water.

CURATIVE AGENTS

EXAMPLE 25

The polyesterdiol of Example 7b (600 g) and 4,4'-methylenebis(2-chloroaniline) (400 g) was charged to a 2000 ml Pyrex reaction flask equipped with agitator, thermometer, and connection to a mechanical vacuum pump. The mixture was heated to 120° C and agitated at 15 mm Hg for thirty minutes after the diamine appeared to have dissolved completely. Then the agitator was turned off and the solution allowed to cool to room temperature under vacuum. The product was a dark liquid with a viscosity of 25,000 cps at 25° C. The combined hydroxyl/amino equivalent weight was determined by acetylation with acetic anhydride in pyridine solution and found to be 280.

The polyesterdiol of the above example may be substituted by other polyester diols exemplified above, or by hydroxyl terminated polyester urethanes prepared from the same polyesterdiols by reaction with less than an equal molar quantity of a diisocyanate. Also, the 4,4'-methylenebis(2-chloroaniline) can be substituted by other aromatic diamine curatives, such as 4,4'-methylenebis(2-methoxycarbonylaniline), 4,4'-methylenebis(2-methylaniline, 4,4'-methylenebis(2-methoxyaniline), 4,4-methylenedianiline, alone or in admixture with its 2,4'- and/or 2,2'-isomers, 2,2'-thiodianiline, and mixed diamines obtained by the acid-catalyzed condensation of a mixture of aniline and/or aniline substituted in the ortho positon by lower-alkyl, lower-alkoxy, lower-alkoxycarbonyl, chloro, or bromo.

EXAMPLE 26

A solution of 137.4 g 4,4'-methylenebis(2-chloroaniline) in 862.6 g of the polyesterdiol of Example 7b was prepared by heating the mixture of the two materials, under vacuum to 100°–105° C, and stirring until the diamine had dissolved completely. The solution was allowed to cool to room temperature under vacuum, and 0.1 percent of dibutyltin dilaurate was added to catalyze the isocyanate-hydroxyl reaction in subsequent reactions of this diamine-polyesterdiol solution with isocyanate-terminated prepolymers. The theoretical combined amino-hydroxyl equivalent weight of this product was 520.

POLYESTER URETHANE ELASTOMERS

EXAMPLE 27

A castable polyurethane elastomer was prepared from the prepolymer of Example 20 and the curative (chain extender) of Example 25: The prepolymer (200 g, 0.3101 NCO equivalents) was charged to a 1000 ml Pyrex glass reaction flask equipped with agitator, thermometer, and connection to a mechanical vacuum pump. The pressure was reduced immediately while heating the prepolymer to 75° C. After degassing for five minutes at 70°–75° C and 10–15 mm Hg, 80.3 g (0.2868 equivalents) of the curative of Example 25, which had been pre-heated to 60° C, was added to the flask. The mixture was stirred vigorously under vacuum for about 30 seconds, then the stirrer was turned off and the homogeneous reaction mixture degassed for another 15 seconds. The liquid then was quickly poured into several molds to provide test platens and compression set test buttons. The useful pot life of this castable elastomer under the conditions employed was judged to be 90–110 seconds. After 20 minutes, the test specimens were removed from the molds (which had been pre-heated to 210°–230° F), and were post-cured in an oven at 219°–230° F for 8 hours. After aging at room temperature for only 1 day, the elastomer was found to have the following physical properties:

| | |
|---|---|
| Shore Hardness | 90A |
| Die "C" Tear Strength | 463 pli |
| Ultimate Elongation | 600% + |
| Ultimate Tensile Strength | 5,760 psi |
| Tensile Set | 25% |
| Tensile Modulus | |
| at 50% Elongation | 1,024 psi |
| at 100% Elongation | 1,152 psi |
| at 300% Elongation | 1,632 psi |
| Compression Set at 70° C, 22 hours, 25% Compression | 21.7% |

EXAMPLE 28

Following the procedure of Example 27, a castable polyurethane elastomer was prepared from the prepolymer of Example 21 and the curative of Example 25. The prepolymer (200 g, 0.1675 equivalents of NCO) was charged to the flask and degassed for 10 minutes at 80°–85° C. Then 46.3 g (0.1654 equivalents) of the curative of Example 25 was charged to the flask and the mixture was stirred and degassed for three minutes, and degassed for 30 seconds longer with the stirrer off. The liquid then was poured into test specimen molds preheated to 200°–210° F. The useful pot life of the castable elastomer under these conditions was judged to be 10 minutes. Thirty minutes after pouring into the molds, the specimens were removed and transferred to an oven at 210°–230° F for eight hours. After aging for one week at room temperature, the elastomer was observed to have the following physical properties:

| | |
|---|---|
| Shore Hardness | 77A |
| Die "C" Tear Strength | 276 pli |
| Ultimate Elongation | 850% |
| Ultimate Tensile Strength | 2,918 psi |

-continued

| Tensile Set | 11% |
| --- | --- |
| Tensile Modulus | |
| at 50% Elongation | 302 psi |
| at 100% Elongation | 367 psi |
| at 300% Elongation | 492 psi |

EXAMPLE 29

(a) Following the procedure of Example 1, crude bis(2-hydroxyethyl) glutarate was prepared from 1430 g ethylene glycol, 1853 g freshly distilled dimethyl glutarate, and 0.13 g tetra-2-ethylhexyl titanate as transesterification catalyst. The transesterification was judged to be complete by means of gas chromatographic analysis 16 hours after distillation of methanol had begun. The product was found to have a hydroxyl equivalent weight of 111.2 and an acid number of 0.2. Azelaic acid (1,805 g) then was charged and the reaction was completed using the conditions of Example 7b. The polyesterdiol was found to have a hydroxyl number of 56.0 and an acid number of 0.32. It was noticed that at the end of the reaction period, the vapor pressure of ethylene glycol above the reaction mixture was less than in the case of the similar polyesterdiol of Example 7b, as evidenced by the relative amount of boil-up into the distillation column under similar conditions of temperature and pressure.

(b) Following the procedure of Example 18, an isocyanate-terminated prepolymer was prepared by reacion of 2000 g (2.008 equivalents) of the polyesterdiol of part a) containing 50 ppm of adipoyl chloride, with 1,600 g of 4,4'-diphenylmethane diisocyanate. The reaction appeared to be more rapid than in the case of Example 18, and the polyesterdiol had to be charged slowly so as to control the exotherm. Upon cooling to room temperature, the prepolymer was found to have an isocyanate equivalent weight of 351 (theoretical value, 334), and a viscosity of 11,400 cps at 25° C.

(c) The preparation of a castable elastomer then was attempted using 200 g (0.570 NCO equivalents) of the above prepolymer (part b), and 28.7 g (0.541 hydroxyl equivalents) of a solution of 95 parts of diethylene glycol and 5 parts of 1,1,1-tris(hydroxymethyl)propane as curative. The casting procedure of Example 27 was employed, with the prepolymer at 75° C and the curative solution at room temperature. After 20–30 seconds mixing, the viscosity began to increase rapidly and the reaction mixture solidified in less than one minute, and before it could be poured into test specimen molds. The observed high reactivity of this system is attributed to the catalytic effect of the titanate used as catalyst in the preparation of the polyester incorporated in the prepolymer.

(d) Following the procedure of part b), the isocyanate-terminated prepolymer of Example 20, 200 g (0.587 NCO equivalents) was cured with 29.5 g (0.557 hydroxyl equivalents) of the curative employed in part c). (In this case, the prepolymer contained residues of a stannous carboxylate catalyst as opposed to residues of titanate catalyst). The pot life of the castable elastomer was 3 minutes. It was poured into test specimen molds preheated to 100° C. The elastomer specimens were demolded after 20 minutes and further cured for 8 hours at 100° C. After aging for 2 weeks at room temperature, they were found to have the following properties:

| Shore Hardness | 95A |
| --- | --- |
| Die "C" Tear Strength | 690 pli |
| Ultimate Elongation | 510% |
| Ultimate Tensile Strength | 5,540 psi |
| Tensile Set | 20% |
| Tensile Modulus | |
| at 50% Elongation | 1,420 psi |
| at 100% Elongation | 1,675 psi |
| at 300% Elongation | 3,050 psi |

EXAMPLE 30

Following the procedure of Example 27, a castable elastomer was prepared by reaction of 150 g (0.283 equivalents) of the prepolymer of Example 22 with 140 g (0.269 equivalents) of the product of Example 26. Prior to mixing the reactants, the prepolymer was heated to 80° C (in the reaction flask) and the polyester-diol-diamine solution to 60° C. The usable pot life of the castable elastomer was 5–6 minutes. With the mold temperature of 100° C, the elastomer specimens could be demolded in less than 30 minutes after the beginning of mixing. After curing for 8 hours at 100° C and aging for one week at room temperature, the elastomer was found to have the properties given in Table I.

EXAMPLE 31

Following the procedure of Example 27, a castable elastomer was prepared by reaction of 200 g (0.326 equivalents) of the prepolymer of Example 23 with 40.4 g (0.303 equivalents) of 4,4'-methylenebis(2-chloroaniline). Prior to mixing the reactants, the prepolymer was heated to 80° C under vacuum in the reaction flask and the diamine was melted and heated to 110°–115° C. The usable pot life of the castable elastomer was about 3 minutes. The mold temperature was 100° C, and the elastomer specimens were demolded 15 minutes after the beginning of mixing. After curing for 8 hours at 100° C and aging for one week at room temperature, the elastomer was found to have the properties given in Table I.

EXAMPLE 32

Following the procedure of Example 27 a castable elastomer was prepared by reaction of 200 g (0.202 equivalents) of the prepolymer of Example 24 with 29.7 g (0.192 equivalents) of the proprietary aromatic diamine curative, CURENE™155 (product of Anderson Development Company, Adrian, Michigan). Prior to mixing the reactants, the prepolymer was heated to 85° C under vacuum in the reaction flask, and the diamine was melted and heated to 150° C. The usable pot life of this system was about 6 minutes. With the mold temperature of 100° C, the elastomer specimens were demolded 40 minutes after the beginning of mixing. After curing 8 hours at 100° C and aging for one week at room temperature, the elastomer was found to exhibit the properties given in Table I.

TABLE I
PROPERTIES OF THE ELASTOMERS OF EXAMPLES 30–32

| | Example 30 | Example 31 | Example 32 |
| --- | --- | --- | --- |
| Shore Hardness | 85A | 65D | 82A |
| Die "C" Tear Strength, pli | — | 910 | 260 |
| Ultimate Elongation, percent | 720 | 325 | 510 |
| Ultimate Tensile Strength, psi | 4,600 | 8,750 | 7,080 |
| Break Set, percent | 15 | 12 | 4.5 |
| Tensile Modulus, psi | | | |
| at 50% Elongation | 560 | 2,400 | 495 |
| at 100% Elongation | 700 | 2,825 | 610 |

TABLE I-continued
PROPERTIES OF THE ELASTOMERS OF EXAMPLES 30-32

|  | Example 30 | Example 31 | Example 32 |
|---|---|---|---|
| at 300% Elongation | 1,110 | 6,980 | 1,260 |
| Compression Set, Method "B", 22 hours at 70° C, 25% Compression, percent | — | 28 | — |

EXAMPLE 33

(a) A hydroxyl terminated polyester urethane was prepared by reaction of 2,210 g (2.6 moles) of the polyesterdiol of Example 23 with 278 g (1.6 moles) of 2,4-tolylene diisocyanate: The polyester was charged to a 5-liter Pyrex reaction flask equipped with dropping funnel, thermometer, agitator, and connection to a vacuum pump. The polyester was heated to 85°–90° C and degassed at a pressure of 10–20 mm Hg. Then the diisocyanate was added, over a 45 minute period, with good agitation, with the flask under vacuum but closed off from the vacuum pump. When addition of the diisocyanate had been completed, the temperature was increased 120°–125° C and held at this level for 30 minutes with the pressure maintained at 10–20 mm Hg. Then the product was allowed to cool to room temperature. It was a viscous liquid whose hydroxyl equivalent weight was found to be 1,232 (theoretical value, 1,250).

(b) A solution of 120 g of 4,4'-methylenebis(2-chloroaniline) in 180 g of the polyester urethane diol of part a) was prepared by heating and agitating the mixture of diamine and diol at 100°–105° C under vacuum until the diamine had dissolved completely. The solution then was cooled to room temperature. It was somewhat more viscous than the product of Example 25, and did not exhibit any tendency to crystallize or solidify upon standing for two weeks at room temperature. Its combined amino/hydroxyl equivalent weight was found to be 285 (theoretical value, 287).

(c) The product of part b) was used as a curative in the preparation of a castable elastomer from the product of Example 17. To 200 g (0.176 NCO equivalents) of the prepolymer of Example 17, in a reaction flask heated to 85° C under vacuum, was added 47.8 g (0.168 equivalents) of the product of part b), which had been preheated to 60° C. The mixture was stirred vigorously under vacuum for one minute, then poured into test specimen molds heated to 100° C. The pot life of the castable elastomer was more than 10 minutes. It was demolded 30 minutes after the beginning of mixing and cured for 8 hours at 100° C. After aging for 2 weeks at room temperature, the elastomer was found to have the following physical properties.

| | |
|---|---|
| Shore Hardness | 79A |
| Die "C" Tear Strength | 245 pli |
| Ultimate Elongation | 770% |
| Ultimate Tensile Strength | 4,050 psi |
| Tensile Set | 15% |
| Tensile Modulus | |
| at 50% Elongation | 250 psi |
| at 100% Elongation | 360 psi |
| at 300% Elongation | 620 psi |
| Compression Set at 70° C, Method "B", 25% compression | 9% |

I claim:

1. A method for preparing hydroxyl terminated neutral polyesters of glutaric acid by transesterification of a diloweralkyl ester of said acid and a polyol which comprises heating a mixture of said polyol and a di-ester of said acid and a volatile lower monohydric alkanol in the presence of a catalytic amount, up to about 150 ppm tin, of a stannous salt of a carboxylic acid and at a temperature and in proportions sufficient a) to effect substantially complete transesterification with substantially complete alcoholysis of said di-ester and with distillation of the thus liberated said lower alkanol and without substantial distillation of polyol and b) to destroy the activity of the catalyst for promoting the reaction of isocyanate with active hydrogen compounds.

2. The method of claim 1, in which the polyol is selected from diols of the class consisting of alkylene diols containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, cycloalkylene diols containing from 4 to not more than 8 carbon atoms, and bis(hydroxymethyl) benzenes, and polyols of the class consisting of 1,1,1-tris(hydroxymethyl)ethane, 1,1,1-tris(hydroxymethyl)propane, 1,2,4-butanetriol, glycerol, and pentaerythritol, and in which the lower alkanol is methanol.

3. The method of claim 1, in which said mixture also contains di-ester of adipic acid and a volatile lower monohydric alkanol.

4. The method of claim 1, in which said mixture contains a di-ester of azelaic acid and a volatile lower monohydric alkanol.

5. The method of claim 1, in which said mixture contains epsilon-caprolactone.

6. The method of claim 1, in which the heating is continued until the polyester has an acid number not greater than 3 and not more than 2 percent carbalkoxy groups.

7. The method of claim 1, in which said lower monohydric alkanol is methanol and in which the heating is continued until the polyester has an acid number not greater than 3 and not more than 2 percent carbomethoxy groups.

8. A method for preparing mixed hydroxyl terminated neutral polyesters of glutaric acid and another dicarboxylic acid having at least 4 and not more than 20 carbon atoms or epsilon-caprolactone, which comprises preparing a hydroxyl terminated neutral polyester of glutaric acid by transesterification of a diloweralkyl ester of glutaric acid and a polyol in proportions to effect substantially complete transesterification and substantially complete alcoholysis of said diloweralkyl ester, and chain extending said hydroxyl terminated neutral polyester of glutaric acid by heating it with a chainextending amount of a chain extender selected from the group consisting of a) said other dicarboxylic acid or the anhydride thereof, b) a mixture of said other dicarboxylic acid or anhydride thereof with a polyol, and c) epsilon-caprolactone at a temperature sufficient to distill off any water formed and to cause chain extension.

9. The method of claim 8, in which the chain extender is adipic acid.

10. The method of claim 8, in which the chain extender is azelaic acid.

11. The method of claim 8, in which the chain extender is epsilon-caprolactone.

12. A hydroxyl terminated neutral polyester having a dicarboxylic acid moiety of at least 4 and not more than 20 carbon atoms which comprises the glutaric acid moiety and the acid moiety of another dicarboxylic acid having from 4 to not more than 20 carbon atoms prepared by heating a polyol and diloweralkyl esters of said acids and volatile lower monohydric alkanols in the presence of a catalytic amount, up to 150 ppm tin, of stannous salt of a carboxylic acid at a temperature and in proportions sufficient to effect substantially complete transesterification with substantially complete alcoholysis of said diloweralkyl esters and with the distillation of the thus liberated said lower alkanols and without substantial distillation of polyol, said polyester being characterized by a residuum of tin which, due to the processing, no longer has the activity of a catalyst for promoting the reaction of isocyanate with active hydrogen compounds, and a residuum of carbalkoxy groups.

13. The polyester of claim 12, in which the polyol is selected from diols of the class consisting of alkylene diols containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, cycloalkylene diols containing from 4 to not more than 8 carbon atoms, and bis(hydroxymethyl)benzenes; and polyols of the class consisting of 1,1,1-tris(hydroxymethyl)ethane, 1,1,1-tris(hydroxymethyl)propane, 1,2,4-butanetriol, glycerol, and pentaerythritol; and in which the lower alkanol is methanol.

14. The polyester of claim 12, in which one component of the other dicarboxylic acid moiety is the adipic acid moiety.

15. The polyester of claim 12, in which one component of the other dicarboxylic acid moiety is the azelaic acid moiety.

16. The polyester of claim 12, which has been chain-extended by a chain-extending amount of epsiloncaprolactone.

17. The polyester of claim 13, in which one component of the other dicarboxylic acid moiety is the adipic acid moiety.

18. The polyester of claim 13, in which one component of the other dicarboxylic acid moiety is the azelaic acid moiety.

19. The polyester of claim 13, which has been chain-extended by a chain-extending amount of epsiloncaprolactone.

20. The polyester of claim 12, having an acid number not greater than 3 and a residuum of carbalkoxy groups not greater than 2 percent.

21. The polyester of claim 13, in which said lower monohydric alkanol is methanol and in which the polyester has an acid number not greater than 3 and a residuum of carbomethoxy groups not greater than 2 percent.

22. The isocyanate terminated polyester urethane prepared by the reaction of a molar excess of organic polisocyanate with the hydroxyl terminated polyester of claim 12.

23. The isocyanate terminated polyester urethane of claim 22, in which the isocyanate is selected from the group consisting of 2,4-tolylene diisocyanate, alone or in admixture with 2,6-tolylene diisocyanate; 4,4'-methylenebis(phenyl isocyanate), alone or in admixture with its 2,4'- and/or 2,2'-isomers; 3,3'-dimethyl-4,4'-diisocyanatobiphenyl; 3,3,'dimethoxy-4,4'-diisocyanatobiphenyl; 4,4'-methylenebis(3-methoxyphenyl isocyanate); 1,5-naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; 4,4'-methylenebis(cyclohexyl isocyanate); 4,4',-4"-tris(isocyanatophenyl)methane alone or in admixture with other isocyanates obtained by the phosgenation of anilineformaldehyde resins; the triisocyanate obtained by the reaction of 3 mols of tolylene diisocyanate with 1 mol of 1,1,1-tris(hydroxymethyl)propane; and, the triisocyanate obtained by the reaction of 3 mols of hexamethylene diisocyanate with one mol of water.

24. The isocyanate terminated polyester urethane of claim 23, in which the polyols are the same or different polyols selected from the group consisting of alkylene diols, containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, cycloalkylene diols containing from 4 to not more than 8 carbon atoms, and bis(hydroxymethyl)benzenes, and polyols of the class consisting of 1,1,1-tris(hydroxymethyl)ethane, 1,1,1-tris(hydroxymethyl)propane, 1,2,4-butanetriol, glycerol, and pentaerythritol.

25. The isocyanate terminated polyester urethane of claim 24, in which one component of the other carboxylic acid moiety is the adipic acid moiety.

26. The isocyanate terminated polyester urethane of claim 24, in which one component of the other carboxylic acid moiety is the azelaic acid moiety.

27. The isocyanate terminated polyester urethane of claim 24, in which the polyester moiety contains a minor amount of pentamethylene carboxy groups derived from epsiloncaprolactone.

28. The isocyanate terminated polyester urethane of claim 24, in which the hydroxyl terminated polyester has an acid number not greater than 3 and a residuum of carbalkoxy groups not greater than 2 percent.

29. A polyurethane elastomer prepared by the chain extension of an isocyanate terminated polyester urethane prepared by reacting said urethane with a curative agent of the group consisting of 1) a hydroxyl terminated polyester urethane having an average molecular weight of less than about 6,000; 2) a solution of a lower molecular weight polyol or an aromatic diamine in a hydroxyl terminated polyester urethane having an average molecular weight of less than about 6,000; 3) a solution of lower molecular weight polyol or an aromatic diamine in a hydroxyl terminated polyester, the polyester moieties of the hydroxyl terminated polyester, the isocyanate terminated polyester urethane, and the hydroxyl terminated polyester urethane, which may have the same or different polyester moieties, being the moieties of those of hydroxyl terminated polyesters prepared by a) heating a polyol and a diloweralkyl ester of glutaric acid and a volatile monohydric alkanol or a mixture of said diloweralkyl ester of glutaric acid and another diloweralkyl ester of a dicarboxylic acid having at least 4 and not more than 20 carbon atoms and a volatile monohydric alkanol in the presence of a catalytic amount, up to 150 ppm tin, of a stannous salt of a carboxylic acid and at a temperature and in proportions sufficient to effect substantially complete transesterification with substantially complete alcoholysis of said diloweralkyl ester and with the distillation of the thus liberated said lower alkanol and without substantial distillation of polyol, said polyester being characterized by a residuum of tin which, due to the processing, no longer has the activity of a catalyst for promoting the reaction of isocyanate with the active hydrogen compounds, and a residuum of carbalkoxy groups, or by b) chain extending the hydroxyl terminated polyester prepared as above, by heating it with a chain-extending amount of a chain extender selected from the group consisting of a dicarboxylic acid of at least 4 carbon atoms and not more than 20 carbon atoms, or an anhydride thereof, and epsiloncaprolactone at a temperature sufficient to distill off any water formed to cause chain extension; 4) said aromatic diamine per se; and 5) said lower molecular weight polyol per se.

30. The polyester urethane elastomer of claim 29, in which the polyol moieties of the polyester and the polyester urethane are the same or different and are derived from polyols selected from the group consisting of alkylene diols containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, and cycloalkylene diols containing from 4 to not more than 8 carbon atoms, and bis(hydroxymethyl)benzenes, and polyols of the class consisting of 1,1,1-tris(hydroxymethyl)ethane, 1,1,1-tris(hydroxymethyl)propane, 1,2,4-butanetriol, glycerol, and pentaerythritol; in which the isocyanate moieties of the polyester urethane are all the same or different and are derived from isocyanates of the group consisting of 2,4-ditolylene isocyanate, alone or in admixture with 2,6-tolylene diisocyanate; 4,4'-methylenebis(phenyl isocyanate), alone or in admixture with its 2,4'- and/or 2,2'-isomers; 3,3'-dimethyl-4,4'-diisocyanatobiphenyl; 3,3'dimethoxy-4,4'-diisocyanatobiphenyl; 4,4'-methylenebis(3-methoxyphenyl isocyanate); 1,5-naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; 4,4'-methylenebis(cyclohexyl isocyanate); 4,4',4''-tris(isocyanatophenyl)methane alone or in admixture with other isocyanates obtained by the phosgenation of aniline-formaldehyde resins; the triisocyanate obtained by the reaction of 3 mols of tolylene diisocyanate with 1 mol of 1,1,1-tris(hydroxymethyl)propane; and, the triisocyanate obtained by the reaction of 3 mols of hexamethylene diisocyanate with one mol of water; in which the aromatic diamine is selected from the group consisting of 4,4'-methylenebis(2-chloroaniline), 4,4'-methylenebis(2-methoxycarbonylaniline), 4,4'-methylenebis(2-methylaniline), 4,4'-methylenebis(2-methoxyaniline), 4,4'-methylenedianiline, alone or in admixture with its 2,4'- and/or 2,2'-isomers, 2,2'-thiodianiline, and mixed diamines obtained by the acid-catalyzed condensation of a mixture of aniline and/or aniline substituted in the ortho position by loweralkyl, lower-alkoxy, lower-alkoxycarbonyl, chloro, or bromo; in which the lower molecular weight polyol is selected from the group consisting of polymethylene glycols up to and including hexane-1,6-diol, diethylene glycol, triethylene glycol, propylene glycol, dipropylene glycol, 1,1,1-tris(hydroxymethyl)ethane, 1,1,1-tris(hydroxymethyl) propane, 1,2,4-butanetriol, 1,2,6-hexanetriol, and glycerol.

31. The polyester urethane elastomer of claim 30, in which the other dicarboxylic acid is adipic acid.

32. The polyester urethane elastomer of claim 30, in which the other dicarboxylic acid is azelaic acid.

33. The polyester urethane elastomer of claim 30, in which the polyester moiety contains a minor amount of pentamethylenecarboxy groups derived from epsilon-carprolactone.

34. The elastomer of claim 30, in which the curative agent is the aromatic diamine and the isocyanate is 2,4-tolylene diisocyanate.

35. The elastomer of claim 30, in which the curative agent is a solution of aromatic diamine in the hydroxyl terminated polyester or the hydroxyl terminated polyester urethane and the isocyanate is 2,4-tolylene diisocyanate.

36. The elastomer of claim 30, in which the curative agent is the aromatic diamine per se, or the lower molecular weight polyol per se.

37. The elastomer of claim 30, in which the agent is the lower molecular weight polyol curative and the isocyanate is 4,4'-methylenebis(phenyl isocyanate).

38. The elastomer of claim 30, in which the curative agent is a solution of the lower molecular weight polyol in the hydroxyl terminated polyester or the hydroxyl terminated polyester urethane and the isocyanate is 4,4'-methylenebis(phenyl isocyanate).

39. A curative agent for the chain extension of isocyanate terminated polyester urethanes which is a homogeneous liquid at room temperature and comprises a member of the group consisting of 1) a hydroxyl terminated polyester urethane having an average molecular weight of less than about 6,000, 2) a true solution of a lower molecular weight polyol or an aromatic diamine in a hydroxyl terminated polyester urethane having an average molecular weight of les than about 6,000, and 3) a true solution of lower molecular weight polyol or an aromatic diamine in a hydroxyl terminated polyester, the polyester moieties of the hydroxyl terminated polyester and the hydroxyl terminated polyester urethane, which may have the same or different polyester moieties, being those of hydroxyl terminated polyesters prepared by a) heating a polyol and a diloweralkyl ester of glutaric acid and a volatile lower monohydric alkanol or a mixture of said diloweralkyl ester of glutaric acid and another diloweralkyl ester of a dicarboxylic acid having at least 4 and not more than 20 carbon atoms and a volatile monohydric alkanol in the presence of a catalytic amount, up to 150 ppm tin, of a stannous salt of a carboxylic acid and at a temperature and in proportions sufficient to effect substantially complete transesterification with substantially complete alcoholysis of said diloweralkyl ester and with the distillation of the thus liberated said lower alkanol and without substantial distillation of polyol, said polyester being characterized by a residuum of tin which, due to the processing, no longer has the activity of a catalyst for promoting the reaction of isocyanate with active hydrogen compounds, and a residuum of carbalkoxy groups, or by b) subsequent reaction of a hydroxyl terminated polyester prepared as above, with or without additional polyol, with a dicarboxylic acid of at least 4 carbon atoms and not more than 20 carbon atoms, or an anhydride thereof, or epsilon-caprolactone.

40. The curative agent of claim 39, in which the polyol used in said transesterification is selected from the group consisting of alkylene diols containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, cycloalkylene diols, containing from 4 to not more than 8 carbon atoms, and bis(hydroxymethyl)benzenes, and polyols of the class consisting of 1,1,1-tris(hydroxymethyl)ethane, 1,1,1-tris(hydroxymethyl) propane, 1,2,4-butanetriol, glycerol, and pentaerythritol.

41. The curative agent of claim 39, in which the other dicarboxylic acid is adipic acid.

42. The curative agent of claim 39, in which the other dicarboxylic acid is azelaic acid.

43. The curative agent of claim 39, in which the polyester moiety contains a minor amount of pentamethylenecarboxy groups derived from epilson-caprolactone.

44. The curative agent of claim 40, which comprises the solution of aromatic diamine in the hydroxyl terminated polyester of member 3.

45. The curative agent of claim 40, which comprises the solution of aromatic diamine in the hydroxyl terminated polyester urethane of member 2 and the isocyanate moiety of which is 2,4-tolylene diisocyanate.

46. The curative agent of claim 40, which comprises the hydroxyl terminated polyester urethane of member 1.

47. The curative agent of claim 40, which comprises the solution of the lower molecular weight polyol in the hydroxyl terminated polyester of member 3.

48. The curative agent of claim 40, which comprises the solution in the hydroxyl terminated polyester urethane of a lower molecular weight polyol of member 2 in which the polyol is selected from the group consisting of polymethylene glycols up to and including hexane-1,6-diol, diethylene glycol, triethylene glycol, propylene glycol, dipropylene glycol, 1,1,1-tris(hydroxymethyl)ethane, 1,1,1-tris(hydroxymethyl)propane, 1,2,4-butanetriol, 1,2,6-hexanetriol, and glycerol, and in which the isocyanate moiety is that of 4,4'-methylenebis(phenyl isocyanate).

49. The hydroxyl terminated polyester urethane prepared by the reaction of organic diisocyanate with a molar excess of hydroxyl terminated polyester which has a dicarboxylic acid moiety of at least 4 and not more than 20 carbon atoms which consists predominantly of the glutaric acid moiety prepared by heating a polyol and a diloweralkyl ester of the acid or acids and a volatile lower monohydric alkanol in the presence of a catalytic amount, up to 150 ppm tin, of a stannous salt of carboxylic acid and at a temperature and in proportions sufficient to effect substantially complete transesterification with substantially complete alcoholysis of said diloweralkyl ester and with the distillation of the thus liberated said lower alkanol and without substantial distillation of polyol, said polyester having a residuum of tin which, due to the processing, no longer has the activity of a catalyst for promoting the reaction of isocyanate with active hydrogen compounds, and a residuum of carbalkoxy groups.

50. The hydroxyl terminated polyester urethane of claim 49, in which the isocyanate is selected from the group consisting of 2,4-tolylene diisocyanate, alone or in admixture with 2,6-tolylene diisocyanate; 4,4'-methylenebis(phenyl isocyanate), alone or in admixture with its 2,4'- and/or 2,2'-isomers; 3,3'-dimethyl-4,4'-diisocyanatobiphenyl; 3,3'dimethoxy-4,4'-diisocyanatobiphenyl; 4,4'-methylenebis(3-methoxyphenyl isocyanate); 1,5-naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; 4,4'-methylenebis(cyclohexyl isocyanate); 4,4',4''-tris(isocyanatophenyl)methane; poly-isocyanates obtained by the phosgenation of of aniline-formaldehyde resins; the triisocyanate obtained by the reaction of 3 mols of tolylene diisocyanate with 1 mol of 1,1,1-tris(hydroxymethyl)propane; and, the triisocyanate obtained by the reaction of 3 mols of hexamethylene diisocyanate with one mol of water.

51. The hydroxyl terminated polyester urethane of claim 50, in which the polyols are the same or different polyols selected from the group consisting of alkylene diols, containing from 2 to not more than 20 carbon atoms, diethylene glycol and higher poly(oxyethylene) glycols containing up to and including 10 oxyethylene groups, dipropylene glycol and higher poly(oxypropylene) glycols containing up to and including 6 oxypropylene groups, al-cycloalkylene diols, ac-cycloalkylene diols, and al- ac-cycloalkylene diols containing from 4 to not more than 8 carbon atoms, and bis(hydroxymethyl)benzenes, and polyols of the class consisting of 1,1,1-tris(hydroxymethyl)ethane, 1,1,1-tris(hydroxymethyl)propane, 1,2,4-butanetriol, glycerol, and pentaerythritol.

52. The hydroxyl terminated polyester urethane of claim 51, in which a minor component of the carboxylic acid moiety is the adipic acid moiety.

53. The hydroxyl terminated polyester urethane of claim 51, in which a minor component of the carboxylic acid moiety is the azelaic acid moiety.

54. The hydroxyl terminated polyester urethane of claim 51, in which the polyester moiety contains a minor amount of pentamethylene carboxy groups derived from epsilon-caprolactone.

55. The hydroxyl terminated polyester urethane of claim 51, having an acid number not greater than 3 and a residuum of carbalkoxy groups not greater than 2 percent.

56. The curvature agent of claim 40, in which the isocyanate moiety of the hydroxyl terminated polyester urthane is derived from an isocyanate of the group consisting of 2,4-tolylene diisocyanate, alone or in admixture with 2,6-tolylene diisocyanate; 4,4'-methylenebis(phenyl isocyanate), alone or in admixture with its 2,4'-and/or 2,2'-isomers; 3,3'-dimethyl-4,4'-diisocyanatobiphenyl; 3,3'-dimethoxy-4,4'-diisocyanatobiphenyl; 4,4'-methylenebis(3-methoxyphenyl isocyanate); 1,5naphthalene diisocyanate; m-xylylene diisocyanate; p-xylylene diisocyanate; hexamethylene diisocyanate; isophorone diisocyanate; trimethylhexamethylene diisocyanate; methyl-2,4-diisocyanatocyclohexane; 4,4'-methylenebis(cyclohexyl isocyanate); 4,4',4''-tris(isocyanatophenyl) methane; polyisocyanates obtained by the phosgenation of aniline-formaldehyde resins; the triisocyanate obtained by the reaction of 3 mols of tolylene diisocyanate with 1 mol of 1,1,1-tris(hydroxymethyl)propane; and, the triisocyanate obtained by the reaction of 3 mols of hexamethylene diisocyanate with one mol of water; in which the aromatic diamine curative is selected from the group consisting of 4,4'-methylenebis(2-chloroaniline), 4,4'-methylenebis(2methoxycarbonylaniline), 4,4'-methylenebis(2-methylaniline), 4,4'-methylenebis(2methoxyaniline), 4,4'-methylenedianiline, alone or in admixture with its 2,4'-and/or 2,2'-isomers, 2,2'-thiodianiline, and mixed diamines obtained by the acid-catalyzed condensation of formaldehyde with aniline and/or aniline substituted in the ortho position by chlorine or bromine.

57. The curative agent of claim 40, in which the lower molecular weight polyol is selected from the group consisting of polymethylene glycols up to and including hexane-1,6-diol, diethylene glycol, triethylene glycol, propylene glycol, dipropylene glycol, 1,1,1-tris(hydroxymethyl)ethane, 1,1,1-tris(hydroxymethyl)propane, 1,2,4-butanetriol, 1,2,6-hexanetriol, and glycerol, and the isocyanate moiety is that of 4,4'-methylenebis(phenyl isocyanate).

* * * * *

UNITED STATES PATENT AND TRADEMARK OFFICE
CERTIFICATE OF CORRECTION

PATENT NO. : 4,096,129　　　　　　　　　　　　　　Page 1 of 5
DATED　　　: June 20, 1978
INVENTOR(S) : William H. Cook It is certified that error appears in the above-identified patent and that said Letters Patent are hereby corrected as shown below:

Col. 1, line 24; "highperformance" should read --high-performance--
Col. 1, line 54; "mmaking" should read --making--
Col. 1, line 61; "thane" should read --thanes--
Col. 2, line 5; "terephthalate manufacture" should read --terephthalate ester manufacture--
Col. 2, line 17; "has been" should read --has now been--
Col. 2, line 30; "residumm" should read --residuum--
Col. 5, line 24; "isocyanatehydroxyl" should read --isocyanate-hydroxyl--
Col. 7, line 8; "weights" should read --weight--
Col. 7, line 52; "(I)" should read --(1)--
Col. 8, line 53; "glutatate" should read --glutarate--
Col. 8, lines 64 & 65; "HO—X—[$O_2C(CH_2)_3CO_2$—X]$_q$—[$O_2C(CH_2)_5$]-s—OH"

should not be hyphenated and should read

--HO—X—[$O_2C(CH_2)_3CO_2$—X]$_q$—[$O_2C(CH_2)_5$]$_s$—OH--

UNITED STATES PATENT AND TRADEMARK OFFICE
CERTIFICATE OF CORRECTION

PATENT NO. : 4,096,129

DATED : June 20, 1978

INVENTOR(S) : William H. Cook

It is certified that error appears in the above-identified patent and that said Letters Patent are hereby corrected as shown below:

Col. 4, lines 20 & 21; "number" should be deleted.
Col. 4, line 23; "equivalents: total" should read -- equivalents:total --
Col. 7, line 5; "ehtylhexanoate." should read -- ethylhexanoate. --
Col. 13, line 68; "b=O" should read -- b=0 --
Col. 14, line 1; "c=O" should read -- c=0 --
Col. 15, line 6; "polyolcuratives" should read -- polyol curatives --
Col. 15, line 15; "compositiions," should read -- compositions, --
Col. 15, line 43; "diclosed" should read -- disclosed --
Col. 16, line 51; "inclduing" should read -- including --
Col. 16, line 54; "minor part" should read -- portion --
Col. 17, line 47; "cycloalkylanediols" should read -- cycloalkylenediols --
Col. 23, line 53; "(2-methylaniline," should read -- (2-methylaniline), --
Col. 25, line 32; "reacion" should read -- reaction --
Col. 34, line 5; "of of" should read -- of --

UNITED STATES PATENT AND TRADEMARK OFFICE
CERTIFICATE OF CORRECTION

PATENT NO. : 4,096,129

DATED : June 20, 1978

INVENTOR(S) : William H. Cook

It is certified that error appears in the above-identified patent and that said Letters Patent are hereby corrected as shown below:

Col. 9, lines 7 & 8; "HO—X—[O$_2$C(CH$_2$)$_3$—CO$_2$—X]$_r$—[O$_2$CYCO$_2$—X]$_p$—OH"

should not be hyphenated and should read

--HO—X—[O$_2$C(CH$_2$)$_3$—CO$_2$—X]$_r$—[O$_2$CYCO$_2$—X]$_p$—OH--

Col. 9, line 16; "way" should read --any--
Col. 9, line 44; "forms" should read --foams
Col. 13, line 5; "prepolymers" should read --prepolymer-- (2nd occurrence)
Col. 14, line 67; "cyante" should read --cyanate--
Col. 15, line 48; "the" should read --and--
Col. 19, lines 54 & 55; "glutara-teazelate" should read --glutarate-azelate--
Col. 19, lines 64 & 65; "glutara-teazelate" should read --glutarate-azelate--
Col. 20, lines 6 & 7; "glutara-teazelate" should read --glutarate-azelate--
Col. 20, lines 56 & 57; "diisocynate." should read --diisocyanate.--
Col. 21, line 56; "100 Hg," should read --100 mm Hg,--
Col. 21, line 68; "remainded" should read --remained--
Col. 28, line 54; "chainextending" should read --chain-extending--

UNITED STATES PATENT AND TRADEMARK OFFICE
CERTIFICATE OF CORRECTION

PATENT NO. : 4,096,129
DATED : June 20, 1978
INVENTOR(S) : William H. Cook

It is certified that error appears in the above-identified patent and that said Letters Patent are hereby corrected as shown below:

Col. 29, line 58; "polisocyanate" should read --polyisocyanate--

Col. 30, line 24, second occurance; "(hydroxymethyl)" should read
 --(hydroxymethyl)- --

Col. 32, line 18; "the agent" should read --the curative agent--

Col. 32, line 19; "polyol curative and" should read --polyol and--

Col. 32, line 34; "les" should read --less--

Col. 33, line 14; "epilson-" should read --epsilon- --

Col. 33, line 19; "40" should read --56--

Col. 33, line 23; "40" should read --56--

Col. 33, line 26; "40" should read --57--

Col. 33, line 29; "40" should read --56--

Col. 34, line 40; "curvature" should read --curative--

Col. 34, line 42; "urthane" should read --urethane--

UNITED STATES PATENT AND TRADEMARK OFFICE
CERTIFICATE OF CORRECTION

PATENT NO. : 4,096,129

DATED : June 20, 1978

INVENTOR(S) : William H. Cook

It is certified that error appears in the above-identified patent and that said Letters Patent are hereby corrected as shown below:

Col. 34, line 63; "(2methoxycarbonylaniline)" should read
--(2-methoxycarbonylaniline)--

Col. 34, lines 64 & 65; "(2methoxyaniline)" should read
--(2-methoxyaniline)--

Signed and Sealed this

Second Day of October 1979

[SEAL]

Attest:

RUTH C. MASON
Attesting Officer

LUTRELLE F. PARKER
Acting Commissioner of Patents and Trademarks